United States Patent
Morag et al.

(10) Patent No.: US 8,217,918 B2
(45) Date of Patent: Jul. 10, 2012

(54) TRANSPARENT DIGITISER

(75) Inventors: Meir Morag, Savyon (IL); Haim Perski, Hod-HaSharon (IL)

(73) Assignee: N-trig Ltd., Kfar-Saba (IL)

( * ) Notice: Subject to any disclaimer, the term of this patent is extended or adjusted under 35 U.S.C. 154(b) by 1074 days.

(21) Appl. No.: 11/905,593

(22) Filed: Oct. 2, 2007

(65) Prior Publication Data

US 2008/0023232 A1 Jan. 31, 2008

Related U.S. Application Data

(62) Division of application No. 10/649,708, filed on Aug. 28, 2003, now Pat. No. 7,292,229.

(60) Provisional application No. 60/406,662, filed on Aug. 29, 2002.

(51) Int. Cl.
G06F 3/033 (2006.01)
G06F 3/041 (2006.01)
G06K 11/06 (2006.01)

(52) U.S. Cl. ............ 345/179; 345/173; 178/18.07; 178/19.03

(58) Field of Classification Search .......... 345/173–181; 178/18.01–20.04
See application file for complete search history.

(56) References Cited

U.S. PATENT DOCUMENTS

| | | | |
|---|---|---|---|
| 4,398,720 A | 8/1983 | Jones et al. | |
| 4,541,633 A | 9/1985 | Newbill et al. | |
| 4,686,332 A | 8/1987 | Greanias et al. | |
| 4,697,050 A * | 9/1987 | Farel et al. | 178/19.07 |
| 4,788,386 A | 11/1988 | Matthews et al. | |
| 4,817,034 A | 3/1989 | Hardin, Sr. et al. | |
| 4,878,553 A * | 11/1989 | Yamanami et al. | 178/18.07 |
| 4,948,926 A * | 8/1990 | Murakami et al. | 178/18.07 |
| 5,129,654 A | 7/1992 | Bogner | |
| 5,138,118 A * | 8/1992 | Russell | 178/19.03 |
| 5,365,461 A | 11/1994 | Stein et al. | |
| 5,381,160 A | 1/1995 | Landmeier | |
| 5,402,151 A | 3/1995 | Duwaer et al. | |
| 5,475,401 A * | 12/1995 | Verrier et al. | 345/179 |
| 5,528,002 A * | 6/1996 | Katabami | 178/19.06 |
| 5,793,360 A | 8/1998 | Fleck et al. | |
| 5,853,327 A | 12/1998 | Gilboa et al. | |
| 5,854,881 A | 12/1998 | Yoshida et al. | |
| 6,005,555 A | 12/1999 | Katsurahira et al. | |
| 6,037,882 A | 3/2000 | Levy | |

(Continued)

FOREIGN PATENT DOCUMENTS

EP 0685816 12/1995

(Continued)

OTHER PUBLICATIONS

Notice of Grant Dated Nov. 30, 2010 From the Korean Intellectual Property Office Re. Application No. 10-2005-7003531 and Its Summary Into English.

(Continued)

*Primary Examiner* — Bipin Shalwala
*Assistant Examiner* — Steven Holton

(57) ABSTRACT

A digitizer for user interaction via an object with an electronically refreshable display screen, the digitizer comprising: a transparent sensing arrangement of detectors located at said electronically refreshable display screen for detecting an electric field of said object, said detectors having outputs, and an arrangement of differential amplifiers associated with said outputs, thereby to apply differential detection between said outputs.

15 Claims, 13 Drawing Sheets

U.S. PATENT DOCUMENTS

| | | | |
|---|---|---|---|
| 6,133,906 | A | 10/2000 | Geaghan |
| 6,175,773 | B1 | 1/2001 | Reiffel et al. |
| 6,220,594 | B1 | 4/2001 | Peng |
| 6,249,234 | B1 * | 6/2001 | Ely et al. .................. 341/20 |
| 6,570,557 | B1 | 5/2003 | Westerman et al. |
| 6,583,676 | B2 | 6/2003 | Krah et al. |
| 6,611,258 | B1 | 8/2003 | Tanaka et al. |
| 6,624,832 | B1 * | 9/2003 | Thomas .................. 715/863 |
| 6,667,740 | B2 | 12/2003 | Ely et al. |
| 6,690,156 | B1 | 2/2004 | Weiner et al. |
| 7,292,229 | B2 | 11/2007 | Morag et al. |
| 2003/0079921 | A1 | 5/2003 | Yeh |
| 2003/0098858 | A1 | 5/2003 | Perski et al. |
| 2003/0122795 | A1 | 7/2003 | Fujitsuka et al. |
| 2003/0188899 | A1 | 10/2003 | Chao et al. |
| 2004/0095333 | A1 | 5/2004 | Morag et al. |
| 2004/0105040 | A1 | 6/2004 | Oh et al. |

FOREIGN PATENT DOCUMENTS

| | | |
|---|---|---|
| EP | 0694856 | 1/1996 |
| EP | 0701848 | 3/1996 |
| EP | 0718750 | 6/1996 |
| EP | 0727756 | 8/1996 |
| EP | 0737933 | 10/1996 |
| EP | 1331547 | 7/2003 |
| FR | 2759919 | 8/1998 |
| JP | 02-143636 | 12/1990 |
| JP | 07-200147 | 8/1995 |
| JP | 08-050535 | 2/1996 |
| WO | WO 98/58237 | 12/1998 |
| WO | WO 99/11344 | 3/1999 |
| WO | WO 02/10791 | 2/2002 |
| WO | WO 2005/020057 | 3/2003 |
| WO | WO 02/10791 | 3/2004 |
| WO | WO 2004/021328 | 3/2004 |

OTHER PUBLICATIONS

Notification of Reasons of Rejection Dated Nov. 19, 2009 From the Japanese Patent Office Re.: Application No. 2004-532648 and Its Translation into English.
Supplementary European Search Report Dated Nov. 24, 2009 From the European Patent Office Re.: Application No. 03791166.6.
Notification of Reasons of Rejection Dated Sep. 25, 2008 From the Japanese Patent Office Re.: Application No. 2004-532648 and Its Translation Into English.
Rekimoto "Augmented Surfaces: A Spatially Continuous Work Space for Hybrid Compiting Environments", Proc of Conference on Human Factors in Computing Systems, pp. 378-385, 1999.
Raymond "The Chess Mysteries of Sherlock Holmes", 1994.
Anonymous "Chess Mysteries of Sherlock Holmes: Fifty Tantalizing Problems of Chess Detection: Problem No. 24", Janko.at, Retrieved From the Internet: http://www.janko.at.htm, 2005.
Translation of Notification of the Reasons for Rejection Dated Mar. 29, 2010 From the Korean Intellectual Property Office Re.: Application No. 10-2005-7003531.
Response Dated Feb. 15, 2010 to Notification of Reasons of Rejection of Nov. 19, 2009 From the Japanese Patent Office Re.: Application No. 2004-532648.
Official Action Dated Feb. 8, 2007 From the US Patent and Trademark Office Re.: U.S. Appl. No. 10/649,708.
Official Action Dated Aug. 18, 2007 From the US Patent and Trademark Office Re.: U.S. Appl. No. 10/649,708.
Communication Pursuant to Article 94(3) EPC Dated May 31, 2010 From the European Patent Office Re. Application No. 03791166.6.
Office Action Dated Sep. 14, 2007 Fron the Patent Office of the People's Republic of China Re.: Application No. 03820696.X.
Rekimoto "Augmented Surfaces: A Spatially Continuous Work Space for Hybrid Compiting Environments", Proc of Conference on Human Factors in Computing Systems, p. 378-385, 1999.
Response Dated Jun. 21, 2010 to Notification of the Reasons for Rejection of Mar. 29, 2010 From the Korean Intellectual Property Office Re.: Application No. 10-2005-7003531.
Official Action Dated Aug. 28, 2006 From the US Patent and Trademark Office Re.: U.S. Appl. No. 10/649,708.
Official Action Dated May 15, 2006 From the US Patent and Trademark Office Re.: U.S. Appl. No. 10/649,708.
International Search Report Dated Feb. 13, 2004 From the International Searching Authority Re.: Application No. PCT/WO2004/021328.
Response Dated Jun. 7, 2007 to Official Action of May 31, 2007 From the US Patent and Trademark Office Re.: U.S. Appl. No. 10/649,708.
Response Dated Jun. 15, 2006 to Official Action of May 16, 2006 From the US Patent and Trademark Office Re.: U.S. Appl. No. 10/649,708.
Response Dated May 8, 2007 to Final Official Action of Feb. 8, 2007 From the US Patent and Trademark Office Re.: U.S. Appl. No. 10/649,708.
Response Dated Nov. 22, 2006 to Official Action of Aug. 23, 2006 From the US Patent and Trademark Office Re.: U.S. Appl. No. 10/649,708.
Response Dated Feb. 15, 2009 to Notification of Reasons of Rejection of Sep. 25, 2008 From the Japanese Patent Office Re.: Application No. 2004-532648 and Its Translation Into English.
Response Dated Dec. 27, 2007 to Office Action of Sep. 14, 2007 Fron the Patent Office of the People's Republic of China Re.: Application No. 03820696.X.
Office Action Dated Mar. 14, 2008 From the Patent Office of the People's Republic of China Re.: Application No. 03820696.X.
Response Dated May 4, 2008 to Office Action of Mar. 14, 2008 From the Patent Office of the People's Republic of China Re.: Application No. 03820696.X.
Translation to Official Letter Dated Jan. 13, 2005 from The Intellectual Property Bureau Ministry of Economic Affairs of Taiwan Re.: Application No. 93105103.
Response Dated Apr. 10, 2005 to Official Letter of Jan. 13, 2005 from The Intellectual Property Bureau Ministry of Economic Affairs of Taiwan Re.: Application No. 93105103.
Response Dated Sep. 21, 2010 to Communication Pursuant to Article 94(3) EPC of May 31, 2010 From the European Patent Office Re. Application No. 03791166.6.
Decision to Grant A European Patent Pursuant to Article 97(1) EPC Dated Apr. 21, 2011 From the European Patent Office Re. Application No. 03791166.6.
Communication Pursuant to Rules 70(2) and 70a(2) EPC and Reference to Rule 39(1) EPC Dated Nov. 28, 2011 From the European Patent Office Re. Application No. 11166405.8.
European Search Report and the European Search Opinion Dated Oct. 24, 2011 From the European Patent Office Re. Application No. 11166405.8.

* cited by examiner

TRANSPARENT DIGITISER

RELATIONSHIP TO EXISTING APPLICATIONS

The present application is a divisional of U.S. patent application Ser. No. 10/649,708 filed Aug. 28, 2003, which claims the benefit of priority from U.S. Provisional Patent Application No. 60/406,662 filed Aug. 29, 2002, the contents of which are both incorporated herein by reference.

FIELD AND BACKGROUND OF THE INVENTION

The present invention relates to a transparent digitizer and, more particularly, but not exclusively to a transparent digitizer with a cordless stylus or like input device.

U.S. patent application Ser. No. 09/628,334 "Physical Object Location Apparatus and Method and a Platform using the same" to Gamalong Ltd, the contents of which are hereby incorporated by reference, describes an electromagnetic method for locating physical objects on a flat screen display, that is to say a digitizer that can be incorporated into the active display screen of an electronic device. The present disclosure concerns further technical methods for implementing a transparent sensor based digitizer.

Touch technologies are commonly used as input devices for a variety of products. The usage of touch devices of various kinds is growing sharply due to the emergence of new mobile devices, such as Web-Pads, Web Tablets, PDAs, Tablet PCs and wireless Flat Screen Displays. These new devices are usually not connected to standard keyboards, mice or like input devices, which are deemed to limit their mobility. Instead there is a tendency to use touch input technologies of one kind or another.

Some of the new mobile devices, such as the Tablet PC, are powerful computer tools. Devices such as the Tablet PC use a stylus based input device, and use of the Tablet PC as a computing tool is dependent on the abilities of the stylus input device. The input devices have the accuracy to support hand writing recognition and full mouse emulation, for example hovering, right click, etc. Manufacturers and designers of these new mobile devices have determined that the stylus input system can be based on various electromagnetic technologies, which can satisfy the very high performance requirements of the computer tools in terms of resolution, fast update rate, and mouse functionality. However, in general, the stylus systems in use are tablet based, that is the stylus is moved over a tablet which in itself is not a screen. There have been attempts in the past to combine non-transparent electro magnetic digitizer technology with a transparent Flat Screen Display. U.S. Pat. No. 6,005,555 to Wacom describes a digitizer comprising two layers of orthogonal conductive loops. One set of conductive loops is used for transmitting an excitation signal while the orthogonal set of loops is used for receiving oscillations. However, a requirement of the Wacom system is high conductivity within the loops. As such, Wacom's method has to use loops made of standard metallic conductors and cannot be used with transparent conductive foils, since the resistance of a conductive transparent line is very high. Using high resistance conductive loops to energize the stylus requires a particularly high voltage input, in excess of 1 KV, which makes this solution impractical. Without the use of transparent conductive material, however, the solution of Wacom merely succeeds in making the display difficult to view.

One way of overcoming the difficulty of viewing the display is to place the non-transparent sensor of Wacom behind the display. Thus the sensor may be located between the FPD back-light and the electronic board of the display device. As such, integration of a non-transparent sensor into a FPD device is a very complicated and expensive process. Such mounting typically requires shielding of noisy components within the device and sometimes requires the manufacturing of a special slot in the FPD structure, in which the sensor is mounted.

A non-transparent sensor, if located behind the display, is inevitably relatively far away from the tip of the stylus whose position it is trying to determine. Due to the relatively long distance from the sensor, non-transparent sensors suffer from parallax, leading to inaccurate positioning of the stylus. Positioning is especially inaccurate, that is parallax effects are especially large, when the stylus is held at an angle to the display. Yet, applications such as handwriting detection demand that the system is tolerant to the stylus being held at an angle to the screen.

Furthermore, again due to the relatively long distance from the sensor, back-mounted sensors suffer from inaccurate positioning of the stylus when the stylus is held close to the edge of the sensor.

In summary, due to the relatively long distance from the sensor, and furthermore due to the number of electronically active components likely to be located between the sensor and the stylus, back-mounted sensors may not achieve reliable positioning resolution.

There have been attempts in the past to overcome the disadvantages of a back mounted sensor by implementation of a sensor based on a transparent foil. As the sensor is transparent it can be mounted on the front of the screen. However, such a detector relies on transparent conductors, which have a high resistivity compared to opaque conductors. U.S. Pat. No. 5,381,160 to Kurta describes a foil comprising two transparent layers of orthogonal conductors. Kurta's disclosure describes a solution to a problem that arises in light of the above-mentioned high resistivity of the conductors, namely how to excite the physical object whose position is to be determined despite the high resistivity. The solution is simply to use an active stylus, internally powered by its own battery. The stylus therefore does not require external excitation. However, an active, battery powered stylus is generally not regarded as a satisfactory solution for a number of reasons. For example, an active stylus requires continuous maintenance and may even stop working and thereby render the entire computer device inoperable. Also the active stylus requires recharging, and is more expensive than a passive device. Therefore, an active stylus is currently unacceptable for the mobile consumer market.

The above-mentioned application to Gamalong discloses a sensor, for a passive stylus, based on transparent foils where a separate excitation coil is located about the screen. The stylus or other object whose position is to be detected comprises a resonant circuit. The resonant circuit is excited by the excitation coil to generate an electric field, and the electric field is detected by the relatively highly resistive detection conductors on the transparent foils. A problem however, is that detection, which is based on electric fields, is carried out on the surface of an electronic display screen, and the screen surface is a relatively high noise environment in terms of electromagnetic activity. The high noise environment necessarily reduces the resolution level of the digitizer.

There is thus a widely recognized need for, and it would be highly advantageous to have, a stylus based transparent digitizer devoid of the above limitations.

SUMMARY OF THE INVENTION

It is a general object of the present invention to enable effective usage of a transparent sensor together with a passive stylus in a high noise environment.

It is a further object of the present invention to enable effective usage of a transparent foil sensor mounted on top of a Flat Panel Display (FPD) such as an LCD or an OLED panel in order to overcome the disadvantages emanating from use of a non-transparent sensor.

It is a general object of the present invention to overcome the disadvantages of a complex and thus expensive integration process involved in mounting a non-transparent sensor behind the screen by enabling the usage of a transparent sensor, which can be integrated in front of the FPD in a straightforward manner.

It is a general object of the present invention to overcome the parallax problem by enabling the usage of a transparent sensor that can be located relatively close to the tip of the stylus.

It is a general object of the present invention to overcome the edge problem, that is of inaccuracies in detecting styluses located at the edge of the sensor, by enabling the usage of a transparent sensor, which can be located very close to the tip of the stylus.

It is a general object of the present invention to overcome the problem of poor resolution due to the separation between sensor and stylus which is exacerbated by active electronic components, by enabling the use of a transparent sensor, which can be located very close to the tip of the stylus.

It is a general object of the present invention to provide accurate stylus location to a level of precision beyond the granularity of the detecting grid, and to provide accurate stylus location which is as noise free as possible.

According to one aspect of the present invention there is provided a device for user interaction via object location in conjunction with an electronically refreshable display screen, the device comprising:

a transparent sensing arrangement of detectors located at the electronically refreshable display screen for detecting a location of the object, the detectors having outputs, and an arrangement of amplifiers for producing differential signals associated with the outputs, the differential signals being signals indicative of a differential between at least two of the outputs, the device being operable to use the signals in the interaction.

Preferably, the amplifiers are differential amplifiers, and preferably the arrangement of detectors is configured for detecting an electric field.

Preferably, the electronically refreshable display screen comprises a flat panel type display screen.

Typically, the object is a pointing device, such as a stylus. Alternatively the object may be a gaming piece. Preferably, the device is integrated with a flat panel display. It may be provided as an accessory for integrating into a mobile computer.

Preferably, the transparent sensing arrangement comprises at least one organic conductive foil.

In one embodiment, the transparent sensing arrangement comprises at least one ITO foil.

The device may comprise at least one high pass amplifier connected between sensors of the sensing arrangement and the amplifier arrangement.

The device may comprise a grid of straight line sensors.

Preferably, the arrangement of differential amplifiers comprises a plurality of differential amplifiers each having a first differential input and a second differential input, and wherein the first differential input is connected to an output of a first sensor, and the second differential input is connected to an output of a second sensor beyond a stylus effective field of the first sensor.

Preferably, the second sensor is at a minimal distance beyond the stylus effective field of the first sensor.

Preferably, each object is configured to produce a field able to affect several neighboring sensors and wherein the respective first and second sensors per amplifier are selected such that different object positions generate outputs at different combinations of amplifiers, thereby permitting different amplifier combinations to be decoded to individual sensors.

The device may be configured to detect phases of signals of the sensors, thereby to distinguish between signals from different sensors.

Preferably, the arrangement of differential amplifiers comprises a plurality of differential amplifiers each having a first differential input and a second differential input, and wherein each of the differential inputs is connected to at least two outputs, each of the at least two outputs being associated with respectively non-neighboring sensors.

Preferably, each object is configured to produce a field able to affect several neighboring sensors and wherein the respectively non-neighboring sensors per amplifier are selected such that different object positions generate outputs at different combinations of amplifiers, thereby permitting different amplifier combinations to be decoded to individual sensors.

The device may be configured to detect phases of the sensor signals, thereby to distinguish between signals from different sensors.

Preferably, each of the differential inputs are connected to at least two outputs, each of the at least two outputs being associated with respectively non-neighboring sensors.

Preferably, the object is a passive object, the digitizer further comprising an excitation arrangement located about the screen for sending an excitation signal to the object, thereby to energize the object to generate an electric field.

Preferably, the excitation arrangement is controllable to generate the excitation signal at a dynamically variable frequency.

Preferably, the excitation arrangement is controllable to generate the excitation signal at a dynamically variable amplitude.

Preferably, the excitation arrangement is controllable to provide a dynamically variable excitation duration.

The device may comprise blanking controllability for blanking of detection during output of the excitation signal.

Preferably, the blanking controllability is operable to continue the blanking for a predetermined delay after output of the excitation signal.

The device may comprise a compensation database in which differences in conductivity between individual sensors are encoded.

The device may comprise a compensation database in which fixed variations in electromagnetic interference over the sensing arrangement are encoded.

Preferably, the compensation database further encodes fixed variations in electromagnetic interference over the sensor arrangement.

The device may comprise an object movement history arrangement for storing data of immediately preceding movement of the object, and using the data in processing of a current location of the object.

Preferably, the processing comprises filtering according to possible hand movements of a user from a prior measured position.

Preferably, the processing comprises filtering according to likely hand movements of a user from a prior measured position.

Preferably, the processing comprises smoothing a locus of the object.

The device may comprise a predictor, associated with the object movement history arrangement for using data of the object movement history arrangement to predict a future locus of the object.

Preferably, the object movement history arrangement with the predictor comprise a slow movement tracker and wherein there is further provided a fast movement tracker for tracking the object, the device being operable to initially set an output of the fast movement tracker as a locus of the object and subsequently to use an output of the slow movement tracker to correct the locus.

Preferably, the object produces an exponentially decaying signal, the digitizer further comprising signal multiplication functionality for multiplying the decaying signal by an opposite, exponentially rising signal, thereby to cancel out frequency side lobes and to increase frequency resolution of the digitizer.

The device may comprise transform functionality for transforming a detected time domain signal into a frequency domain signal, and wherein transform functionality is operable to select a transform type dependent on a likely number of frequencies to be detected.

The device may comprise transform functionality for transforming a detected time domain signal into a frequency domain signal, and wherein transform functionality is operable to dynamically select a transform type dependent on a current number of frequencies to be detected.

Preferably, the transform types for selection comprise the Fast Fourier Transform and the Discrete Fourier Transform.

Preferably, the transform types for dynamic selection include the Fast Fourier transform and the Discrete Fourier Transform.

The device may comprise a thresholder, associated with the transform functionality, for setting a threshold number of frequencies, the threshold for switching between the Fast Fourier transform for a high number of frequencies relative to the threshold and the Discrete Fourier transform for a low number of frequencies relative to the threshold.

According to a second aspect of the present invention there is provided a passive stylus for use with a digitizer, comprising:

an outer stylus shaped housing having a front tip, a resonator arrangement having a predetermined resonant frequency, and a gap at the tip across which the resonator arrangement is coupled, to create an electric field concentration in the vicinity of the front tip.

The stylus may comprise a ferrite coil.

Preferably, the resonator is remotely located from the tip and coupled thereto via a conductor.

The device may comprise switchable components to contribute to the resonator arrangement to modify the predetermined resonant frequency to indicate different mode settings of the stylus.

The device may comprise a modulator for providing detectable variations in the electric field according to different mode settings of the stylus.

The stylus may comprise a reverse tip located at a second end remote from the front tip, a conductor arrangement extending to the reverse tip.

In an embodiment, the geometry in the vicinity of the reverse tip is different from the geometry in the field of the front tip, thereby to provide a detectable difference between the front and reverse tips.

There may be provided switchable components associated with the reverse tip, to contribute to the resonator arrangement to modify the predetermined resonant frequency to indicate different mode settings of the stylus.

Preferably, the detectable variations are variable delays in coupling of the electric field to the gap.

The device may comprise a normally closed switch associated with the front tip.

According to a third preferred embodiment of the present invention, a digitizer for user interaction with an electronic device having an electronically refreshable display screen, the digitizer comprising:

a transparent sensing grid located on the electronically refreshable display screen for detecting electronic signals from an object, the grid having a plurality of outputs, and an arrangement of amplifiers wherein each amplifier is connected over at least two outputs of the sensing grid to produce an output signal being a function of the at least two outputs.

According to a fourth preferred embodiment of the present invention, there is provided a digitizer for user interaction via an electronically passive object with an electronically refreshable display screen, the digitizer comprising:

a transparent sensing arrangement of detectors located at the electronically refreshable display screen for detecting an electric field of the object, the detectors having outputs, an arrangement of amplifiers associated with the outputs, and an excitation arrangement for generating excitation signals for the passive object to enable the passive object to generate or issue the electric field, the excitation arrangement being dynamically controllable to change a sampling rate at which the excitation signal is generated or issued.

Preferably there is provided a state detector to detect a state of the object, thereby to carry out the dynamic control of the sampling rate.

Preferably, the state detector is operable to detect at least one of a group comprising a user-switched state, a contact state of the object with a surface, a contact state of the object with the screen, a right click and eraser action.

The digitizer may comprise a frequency detector to detect a number of object frequencies present, the number being usable in the dynamic control of the sampling rate.

According to a fifth preferred embodiment of the present invention there is provided a digitizer for user interaction via an electronically passive object with an electronically refreshable display screen, the digitizer comprising:

a transparent sensing arrangement of detectors located at the electronically refreshable display screen for detecting an electric field of the object, the detectors having outputs, an arrangement of amplifiers associated with the outputs, and an excitation arrangement for generating and issuing an excitation signal for the passive object to enable the passive object to generate the electric field, and wherein the arrangement of amplifiers is controllable, in association with the excitation arrangement, with a blanking period such that the arrangement of amplifiers is prevented from detecting during issuance of the excitation signal.

According to a sixth preferred embodiment of the present invention there is provided a digitizer for user interaction via an object with an electronically refreshable display screen, the digitizer comprising:

a transparent sensing arrangement of detectors located at the electronically refreshable display screen for detecting an electric field of the object, the detectors having outputs, and an arrangement of amplifiers associated with the outputs, each amplifier being connected to outputs of at least two respectively non-neighboring sensors, the respectively non-neighboring sensors per amplifier being selected such that different object positions generate outputs at different combinations of amplifiers, thereby permitting different amplifier combinations to be decoded to individual sensors.

According to a seventh preferred embodiment of the present invention there is provided a digitizer for user interaction via an electronically passive object with an electronically refreshable display screen, the digitizer comprising:

a transparent sensing arrangement of detectors located at the electronically refreshable display screen for detecting an electric field of the object, the detectors having outputs, an arrangement of amplifiers associated with the outputs, and an excitation arrangement for generating an excitation signal for the passive object to enable the passive object to generate the electric field, the excitation arrangement being dynamically controllable to change a property of the excitation signal.

Preferably, the property is one of frequency, amplitude and phase.

Preferably, the arrangement is operable to use a state of the object to set the dynamically controllable property.

Preferably, with a surface, a contact state of the object with the screen, a current velocity of the object, a current acceleration state of the object, and a current orientation of the object.

According to a seventh aspect of the present invention there is provided a device for user interaction via object location in conjunction with an electronically refreshable display screen, wherein the object is a passive electromagnetic stylus, and the screen is overlaid with a transparent sensing arrangement.

Preferably, the transparent sensing arrangement is configured for detecting an electric field.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
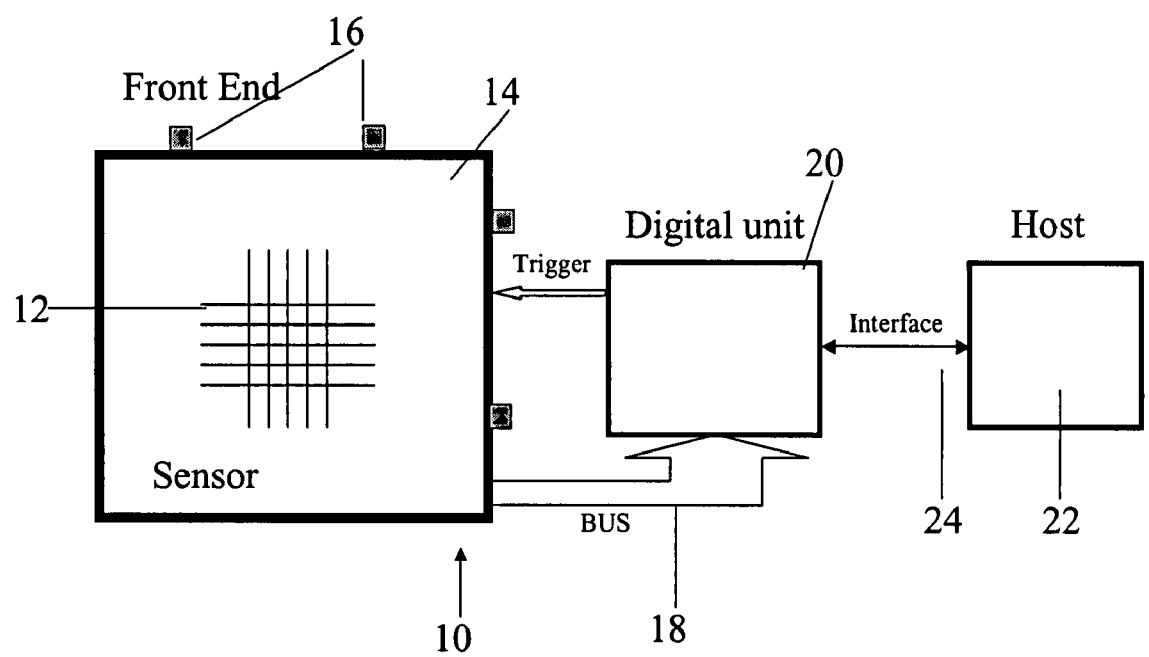
FIG. 1 is a simplified block diagram of a digitizer according to a first preferred embodiment of the present invention.

The present embodiments disclose a method and apparatus for locating and identifying physical objects, such as a stylus or game tokens, on top of a Flat Panel Display. The location of the physical objects is sensed by an electro magnetic transparent digitizer, which is preferably mounted on top of the display. The physical objects are preferably passive elements, that is they do not include any kind of internal power source. The passive elements are energized by a non-transparent excitation coil, which is placed substantially about the transparent sensor. The transparent sensor comprises a sensing grid or an arrangement of sensing loops, whose outputs are connected to sensing amplifiers. In one preferred embodiment the sensing amplifiers are differential amplifiers and in one preferred embodiment each sensing amplifier is connected to at least two non-adjacent outputs from the grid.

A further preferred embodiment comprises an arrangement of the passive stylus in which a projection of wires into the tip is made in order to provide a sharp and therefore more easily detectable electric field. The concentration of the field at the tip allows the field to be distinguished more easily from noise and thereby improves the resolution of the digitizer.

The principles and operation of a transparent digitizer according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

A preferred use for the present embodiments is a transparent digitizer for a mobile computing device that uses a flat panel display (FPD) screen. The digitizer of the present embodiments detects the position of one or more styluses at a very high resolution and update rate. The stylus is applicable to any standard stylus use, including pointing, painting, writing, including handwriting recognition applications, and deleting, and may also be applied to any other activity that can be stylus based. The stylus, together with the digitizer, may for example support full mouse emulation. In a typical mouse emulation application, as long as the stylus hovers above the FPD, a mouse cursor follows the stylus position. Touching the screen is equivalent to the left click of a mouse and a switch located on the stylus emulates right click operation. As well as full, or partial, mouse emulation, different embodiments may support various additional features such as an Eraser, change of color, etc.

In a preferred embodiment, the digitizer communicates with the host computer using a serial link, such as RS232. However, in different embodiments the digitizer may communicate via USB or any other type of communication. In some embodiments the digitizer may even communicate with the host using a wireless link such as based on Infrared, Ultrasonics or RF.

In a preferred embodiment, the mobile device is an independent computer system having its own CPU. In different embodiments the mobile device may only be a part of system, for example it may be a wireless mobile screen for a Personal Computer. In other embodiments the digitizer is used with a standard desktop computer. A digitizer built into the screen may be particularly useful for computers in hazardous environments such as on a factory floor.

In a preferred embodiment, the digitizer is integrated into the host device on top of the FPD screen. In additional embodiments the transparent digitizer may be provided as an accessory to be placed on top of an existing screen. Such a configuration can be very useful for laptop computers already in the market in very large numbers. An embodiment of the present invention may comprise an accessory to transform an existing laptop into a powerful device that supports hand writing, painting or any other operation enabled by the transparent digitizer.

In a preferred embodiment, the digitizer supports a single stylus. However, different embodiments may be used for supporting more than one stylus operating simultaneously on the same screen. Such a configuration is very useful for entertainment applications which require more than one user to paint or write to the same paper-like screen, perhaps even simultaneously. The present embodiments may further be used in applications which require more than one object to be detected, for example games with a plurality of playing pieces. In such a game, the display may for example show a game board for a particular game. The physical objects are shaped as the tokens, gaming pieces, toys, simulation figures and the like as required by the game being displayed. An arrangement supporting gaming over a transparent screen is described in U.S. patent application Ser. No. 09/628,334 to Gamalong, the contents of which are hereby incorporated by reference, wherein each of the playing pieces is distinguished by a different resonant frequency.

U.S. Provisional Patent Application 60/333,770 to N-trig, the contents of which are hereby incorporated by reference, describes a combination of a transparent electromagnetic sensor for detecting a stylus, and pressure sensitive stripes for detection of finger touch on the screen. In a preferred embodiment of the present invention, such pressure sensitive stripes are likewise combined in the electro magnetic foil. In other embodiments, electromagnetic sensing is the only form of sensing used, and the pressure sensitive stripes are dispensed with.

In a preferred embodiment, the digitizer is implemented using a set of transparent foils which are placed on the transparent screen, as will be explained in greater detail below. However, certain embodiments may be implemented using other kinds of transparent, or even a non-transparent, sensor. One example of an embodiment which does not use a transparent screen is a Write Pad device, which is a thin digitizer that is placed below normal paper. The user writes on the paper using a stylus that combines real ink with electromagnetic functionality. The user writes on the normal paper and the input is simultaneously transferred to a host computer to store or analyze the data. It will be appreciated that, given the thinness of paper, the parallax effects of the screen thickness do not apply. Furthermore, the noise effects due to intervening electronic components also do not apply.

An additional example of how the present invention can be applied to a non-transparent sensor is an electronic entertainment board. The digitizer, in this example, is mounted below a graphic image of a board, and detects the position and identity of gaming figures that are placed on top of the board. The graphic image in this case is static, but it could be manually replaced from time to time, such as when switching to a different game.

In one preferred embodiment of the present invention, a non-transparent sensor may be integrated into the back of a FPD. One example of such an embodiment is an electronic entertainment device having a FPD display. The device may be used for games, during the course of which the digitizer detects the position and identity of gaming figures. It could also be used for painting and/or writing, and the digitizer may be required to detect one or more styluses. In many cases, a configuration of a non-transparent sensor with an FPD can be sufficient when high performance is not critical for the application.

General

Reference is now made to FIG. 1, which is a simplified block diagram of a first preferred embodiment of the present invention. A digitizer arrangement is applied to a display screen host arrangement 10. The digitizer arrangement comprises a grid-based sensor 12, which is preferably transparent, and which is located on top of an FPD 14. Analog front-end ASICs 16 are preferably mounted on the frame of the sensor. The ASICS are preferably connected to outputs of the various conductors in the grid as will be explained in greater detail hereinbelow. Each front-end receives very low amplitude signals as output by the sensor conductors. It will be recalled that the sensor conductors, being transparent, have relatively high resistivity, limiting the amplitude of output signals. The ASIC 16 comprises circuitry to amplify the signal, identify and filter out irrelevant frequencies, sample the output into a digital representation and forward the sampled data to a data bus 18 for further digital processing at digital processing unit 20. Digital processing unit 20 is responsible for running various digital processing algorithms, as will be discussed in greater detail hereinbelow. The outcome of the digital processing performed by unit 20 is preferably the position of one or more physical objects, typically the position of the stylus, and the outcome, once determined, is forwarded to host 22 via interface 24 for processing by the operating system or any current application. In a preferred embodiment the digital unit communicates with the host via a simple serial interface. Additional interfaces, such as USB, are possible.

An additional task of the digital processing unit 20 is to produce and manage a triggering pulse to be provided to excitation coil 26 that surrounds the sensor arrangement and the display screen. The excitation coil provides a trigger pulse that excites passive circuitry in the stylus to produce a response from the stylus that can subsequently be detected.

Figure 2:
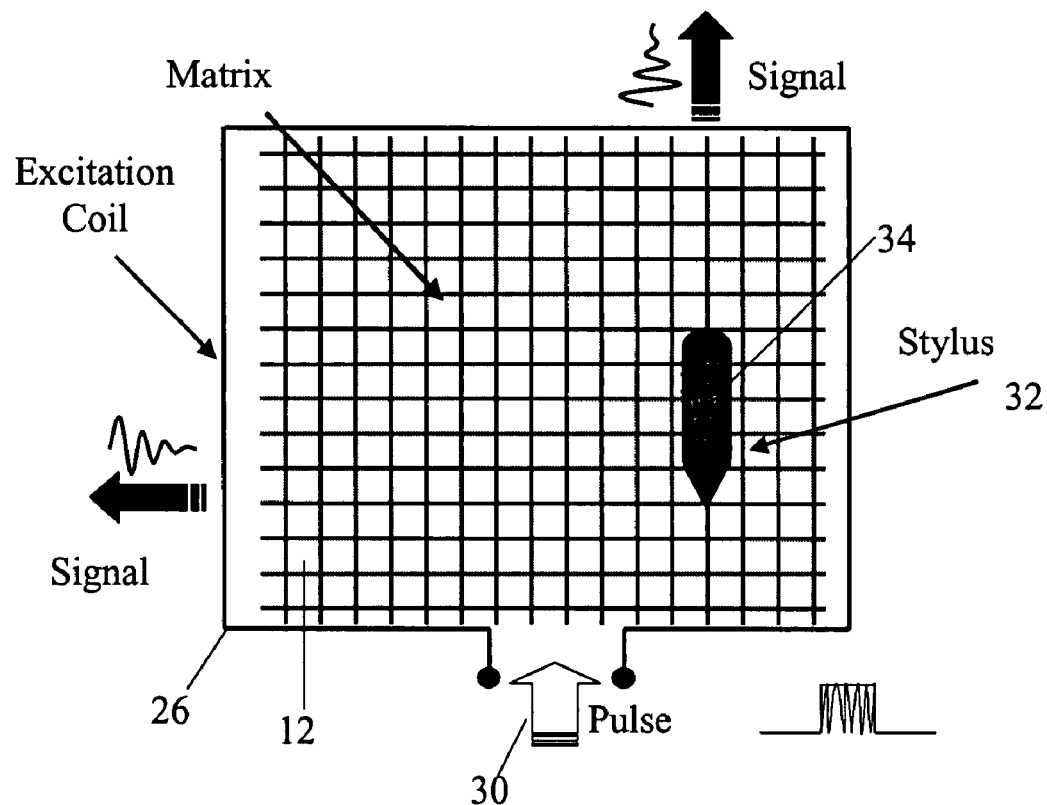
FIG. 2 is a simplified schematic diagram showing the stylus, sensors and excitation coil of FIG. 1, and describing a general principal of the preferred embodiments.

Reference is now made to FIG. 2, which is a simplified schematic diagram showing the stylus, sensors and excitation coil and describing the general principal of the preferred embodiments. Parts that are the same as in FIG. 1 are given the same reference numerals and are not described again except to the extent necessary for an understanding of the present figure. Triggering pulse 30 is provided to excitation coil 26 that surrounds the sensor. Stylus 32 comprises a resonant circuit 34, which is triggered by the excitation coil to oscillate at its resonant frequency. At the resonant frequency the circuit produces oscillations that continue after the end of the excitation pulse and steadily decay. The decaying oscillations are sensed by the sensor arrangement which comprises a matrix or grid 12 of conductors. Accurate stylus positioning can be obtained, as will be explained below, from low amplitude vertical and horizontal signals that are picked up in the sensor arrangement and output to the front end units of FIG. 1.

Sensor

Figure 3:
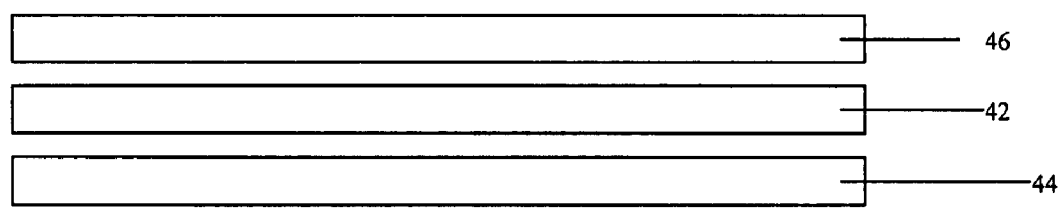
FIG. 3 is a simplified diagram illustrating a preferred embodiment of a sensor for use in the digitizer of FIG. 1.

Reference is now made to FIG. 3, which is a simplified diagram illustrating a preferred embodiment of the sensor arrangement. As explained above, the sensor arrangement in one preferred embodiment comprises a grid 12 of conductive lines. The grid preferably comprises conductive polymers patterned on a polyester thermoplastic (PET) foil 40. The grid preferably comprises two separate layers 42 and 44, electrically separated from each other by the PET layer 40. One of the layers 42 contains a set of parallel conductors arranged in one direction. The other layer 44 contains a set of parallel conductors orthogonal to those of the first layer.

In a preferred embodiment, the parallel conductors are straight antenna lines, connected at one end to an analog amplifier and at the other end to a common ground via a high value resistor. In an alternative embodiment, pairs of conductors are shorted together to create conductive coil loops. In such an embodiment, one side of the loop is connected to the analog amplifier and the other side to the common ground. Alternatively, in the case of loops, the two sides of the loop may be connected to two inputs of a differential amplifier.

In a preferred embodiment, the sensor is patterned using transparent conductive materials so as to be mounted on top of a FPD. The use of such materials is to enable the highest possible transparency of the sensor. It is preferable to minimize the visual difference between conductive and non-conductive sensor areas, as the user desires an unimpeded view of the screen.

The use of organic conductive materials on a PET foil is preferred as a solution which is flexible, easy to handle and minimizes the visual difference between conductive and non-conductive areas, as compared to other available solutions. However, for certain applications, different considerations may apply and thus implementations using other transparent conductive materials may be considered. An example of an alternative choice is semiconductor-based indium tin oxide (ITO).

In a preferred embodiment, the resistance of the conductive lines is relatively high and may exceed 100 KOhm for a line. In general, higher resistance in the transparent conductors corresponds to a higher transparency of the material. Therefore, it is desirable to work, in the present embodiments, with levels of resistance of the sensor grid that are as high as possible. However, in alternative embodiments the sensor may be constructed of low resistance conductors, usually not transparent.

There are a number of possible methods of applying the conductors to the film. In a first preferred embodiment, patterning of the transparent sensor is implemented by printing conductive material in areas which are intended to conduct, that is to say the conductors are printed onto the film. An alternative embodiment comprises forming a continuous layer of conductive material on the film and then removing the conductive materials from those areas which are not intended to conduct. Suitable methods for selectively removing the conductive material are well known in the art. Both of the above-mentioned ways are suitable as methods of manufacture, however, an advantage of the first mentioned method is the practically infinite resistance between the conductors. In the second, a finite leakage conductivity remains between the conductors as etching is not perfect. A disadvantage of both methods is a relatively noticeable visual difference between the conductive and non-conductive areas.

A further embodiment comprises a method of manufacturing the grid which minimizes the visual difference between conductive and non-conductive sensor areas. In the further embodiment, the entire area is coated with conductive material as before and then the non-conductive areas are passivated, that is to say they are treated to increase their resistance. As the same layers are present throughout the film, the visual difference between conductive and non-conductive areas is minimized.

One disadvantage of using the above process, and selectively increasing resistance after forming the conductive layer, is that whilst high resistivity is produced, it is still far short of an insulator. The process thus results in relatively high parasitic inductance and leakage current between the patterned lines. Careful selection of parameters during the passivation process can minimize such effects.

Considering the embodiment in which conductive polymer is coated and then passivated, a film coated with the conductive polymer is subsequently further coated with a protective coating in those areas where conductivity is intended to be retained, that is the areas that are intended to conduct. The coating can be provided in many ways, for example screen printing, photolithography, etc. The film with the protective, or masking, layer, is then rinsed with water in such a way as to avoid mechanical stress during rinsing. After rinsing it is immersed in a bath with a solution of hypochlorite at a defined chlorine concentration, PH, temperature and time, as will be clear to the person skilled in the art. The parameters are a key factor to achieve a result at the correct resistivity with the appropriate contrast between conductive and non-conductive lines, and the skilled person be able to carry out a certain amount of experimentation in order to optimize these parameters. After the hypochlorite bath the film is then immediately passed through a series of distilled water baths to remove the chlorine. Finally the film is dried in an oven.

In an example, the concentration of hypochorite used was 0.1%, immersion time was for 45 seconds, and the temperature was 25 degrees. Three distilled water baths were used, and drying was carried out for 3 minutes at 50 degrees.

In a preferred embodiment, the conductors are straight lines having 1 mm width, equally spaced at 4 mm intervals. Depending on the application however, different sizes and spacings may be used. Large intervals between the lines may be selected in order to reduce the total number of conductors and therefore to reduce the complexity of the electronics and thus the price of the system and also increase reliability. Smaller intervals on the other hand may be selected to give higher resolution. Wider line width may be selected in order to reduce the resistance of a conductive line, again, at the cost of resolution.

The magnitude of a signal received by a specific line is dependent on the resistance of that line, and the position of the stylus is determined by the relative magnitude of the signals received by the whole grid. Therefore, in one embodiment, the resistance of parallel conductors in a certain foil is similar, and up to 5% tolerance is considered acceptable. However, other embodiments may be implemented with various differences between the line impedances, that is to say with larger tolerances, for example to reduce manufacturing costs. Such non-uniformity in principle leads to lower positioning accuracy. However, in one preferred embodiment, following manufacture of a given foil, testing is carried out over the conductors and a database is constructed to calibrate for any differences measured between the different conductors. The system thereby compensates automatically for the manufacturing tolerances. Such a database can be built either manually or automatically by the system. One way of automatic creation of such a database comprises providing the sensor with a common signal using the excitation coil, and then measuring the magnitude of the signals received by each of the conductors. The signals at each of the conductors are compared to a value that would be expected at zero tolerance and the differences are encoded in the database.

Returning to the issue of construction of the sensing apparatus, and in one embodiment, the transparent sensor is constructed using three separate layers, which are implemented on three different foils. As shown in FIG. 3, two layers 42 and 44 are used for the sensor grid, one for the x axis conductors and one for the y axis conductors respectively, and the third layer, shown as 46 in the figure, is used to provide hard coating and anti-glare properties. Advantages of the three-layer embodiment include overall simplicity and, additionally, an ability to build the sensor using off-the-shelf components. A disadvantage of the approach is the relatively low overall transparency due to the presence of three separate foils in front of the display screen.

Figure 4:
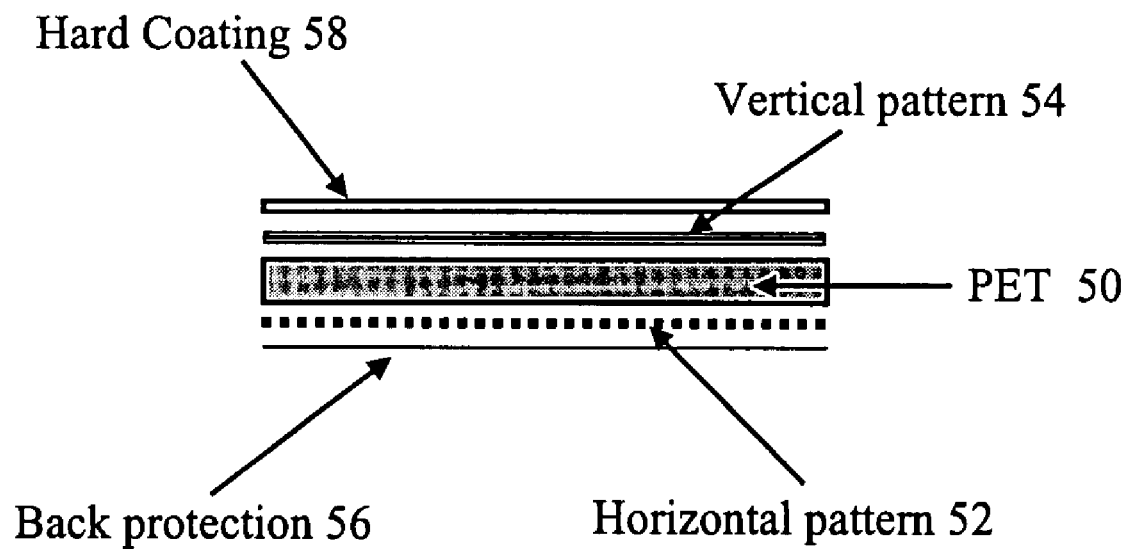
FIG. 4 is a one-foil configuration of a sensor for use with the embodiment of FIG. 1, in which a Polyester PET foil is patterned on its lower size with horizontal conductors and on its upper side with vertical conductors.

A further embodiment is now described in which the sensing arrangement is constructed using a single foil and thereby improving overall transparency. Reference is now made to FIG. 4 which shows such a one-foil configuration. In FIG. 4, a polyester PET foil 50 is patterned on its lower size with horizontal conductors 52 and on its upper side with vertical conductors 54. The upper side is covered and/or treated with suitable coatings to form hard coating layer 56, and the lower side is covered by a protective layer 58, helpful for avoiding integration or shipping damage.

The skilled person will note that additional implementations are possible such as embodiments based on two foils.

In a preferred embodiment, the grid is patterned onto Polyester PET foils. However, in different embodiments, the grid, or part thereof, or any of the layers, may be patterned onto different materials such as glass or semiconductors or onto different types of plastic foils.

In a preferred embodiment, the sensor is surrounded by a non-transparent frame constructed from a PCB or any kind of flexible circuit. The frame preferably hosts the following components: front-end analog components, conductors for connecting the grid to the front-end, conductors for connecting the front-end to the digital processing section, and the excitation coil.

In a preferred embodiment, the transparent conductors are connected to the frame using vertically (Z) conductive glue. An example of such a vertically conductive glue is product no. 9703 manufactured by 3M Corporation. In order to get a reliable connection to the frame, silver pads may be printed on the edge of the transparent conductors. In an alternative embodiment, the silver pads may be avoided and the foil may be connected directly to the surrounding frame.

In another preferred embodiment, the front-end components are mounted directly on the transparent foil. In this case conductors to and from the front-end may be implemented either by patterning applied to the transparent conductive material or by printing different materials, such as silver, onto the foil.

In one preferred embodiment, the digital processing unit comprises a separate board that is connected to the sensor via a cable. In an additional embodiment, the size of the digital processing unit is reduced such that it may be mounted on the sensor frame or even on the edge of the foil.

Front End

Figure 5:
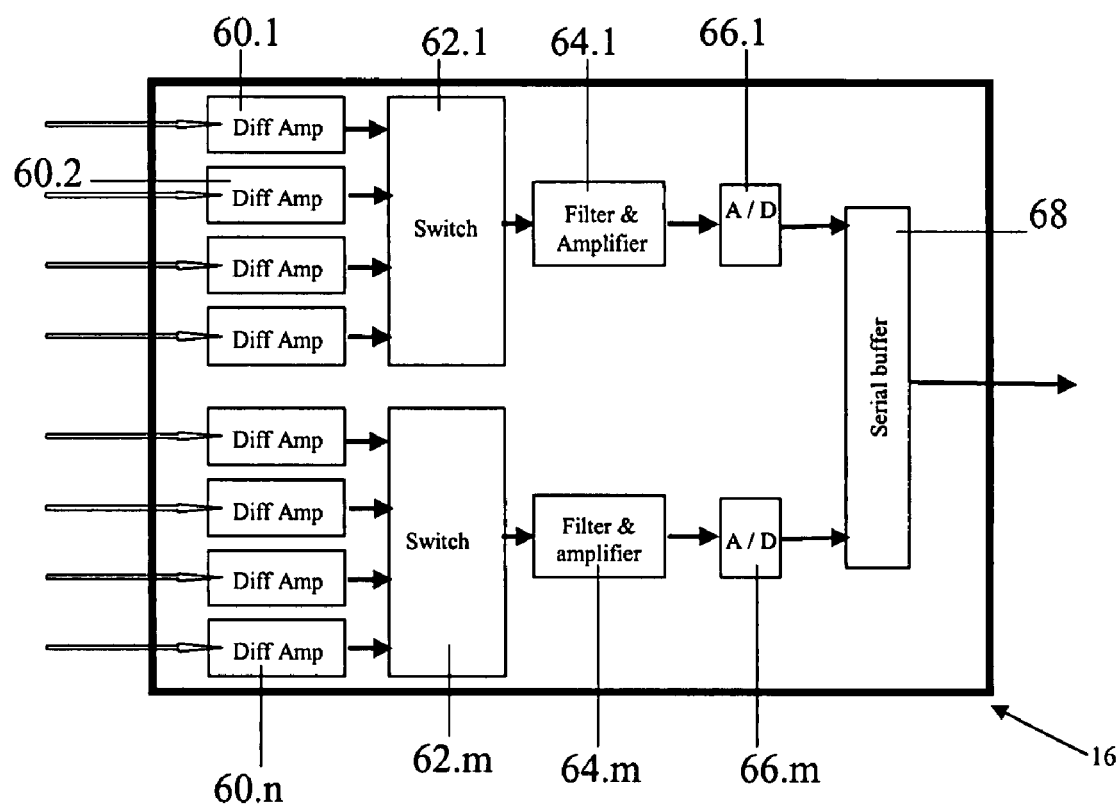
FIG. 5 is a simplified schematic diagram illustrating the internal configuration of the front-end unit of FIG. 1 according to a preferred embodiment of the present invention.

Reference is now made to FIG. 5, which is a simplified block diagram showing the internal configuration of the front-end unit 16 of FIG. 1 according to a preferred embodiment of the present invention. The front end unit 16 comprises a series of differential amplifiers $60.1 \ldots 60.n$. The differential amplifiers are connected in groups to switches $62.1 \ldots 62.m$. The switches pass on signals from one of the connected amplifiers to the next stage. The switches are in turn connected to filter and amplifier circuits $64.1 \ldots 64.m$, and A/D converters $66.1 \ldots 66.m$. The A/D converters are connected to an output buffer 68, which produces a final output signal for the digital processing unit.

Each of the differential amplifiers $60.1 \ldots 60.n$ is preferably connected via each of its differential inputs to a different one of the sensors of the grid. As will be explained below, the two sensors that are connected to a single differential amplifier are preferably not adjacent sensors. The individual sensor signals are thus converted into signals indicating the difference between two sensors. The difference signal is amplified and forward to switch 62. Each switch is connected between four amplifiers and selects one of the four available amplifier inputs to be further processed. The selected signal is amplified and filtered by the Filter & Amplifier 64, after which it is sampled by A/D converter 66. The digitized sample is then forwarded to buffer 68 and sent on to the processing unit.

In a preferred embodiment, the front end is implemented by a dedicated ASIC. However, in different embodiments, the front-end may be built from a combination of off-the-shelf components.

In the preferred embodiment illustrated, each front-end ASIC contains two identical channels, each handling four differential inputs, so that, in the reference numerals of the figures, n=8 and m=2. Such an ASIC contains two A/D converters, two Filter & Amplifier units, two switches and eight differential amplifiers. Alternate embodiments may of course utilize different ASIC configurations, for example a different number of channels may be arranged in each IC or a different number of inputs may be provided to each of the switches. In one embodiment the switch may be dispensed with altogether and the differential amplifiers may be connected directly to respective A/D converters. An advantage of such a configuration is that it is possible to sample all input lines at the same time, but at a cost of increased complexity. Full simultaneous sampling is useful for energy saving, since all inputs are sampled at each excitation pulse, thus requiring only a single excitation pulse per detection. A significant disadvantage of the above embodiment, where all inputs are sampled simultaneously, is its relatively higher price.

In a preferred embodiment, the switch 62 is located before the Filter & Amplifier 64 thus saving on redundant components More particularly relocation of switch 62 in front of the filter and amplifier 64 reduces the total number of filters needed from 8 to 2. Such a configuration prevents fast switching between the inputs since the filter requires a relatively long setup time. However, in a different embodiment, the switch 62 is placed after the Filter & amplifier 64 so that the filter and amplifier 64 is in proximity to the differential amplifier 60. In such a case it is possible to provide one filter 64 per differential amplifier 60. Such a configuration allows relatively fast switching between the inputs. In such a case, it is possible to add an A/D converter having a sampling rate which is several times higher than that required by the straightforward sampling procedure, so that more than one input can be sampled simultaneously.

Figure 6:
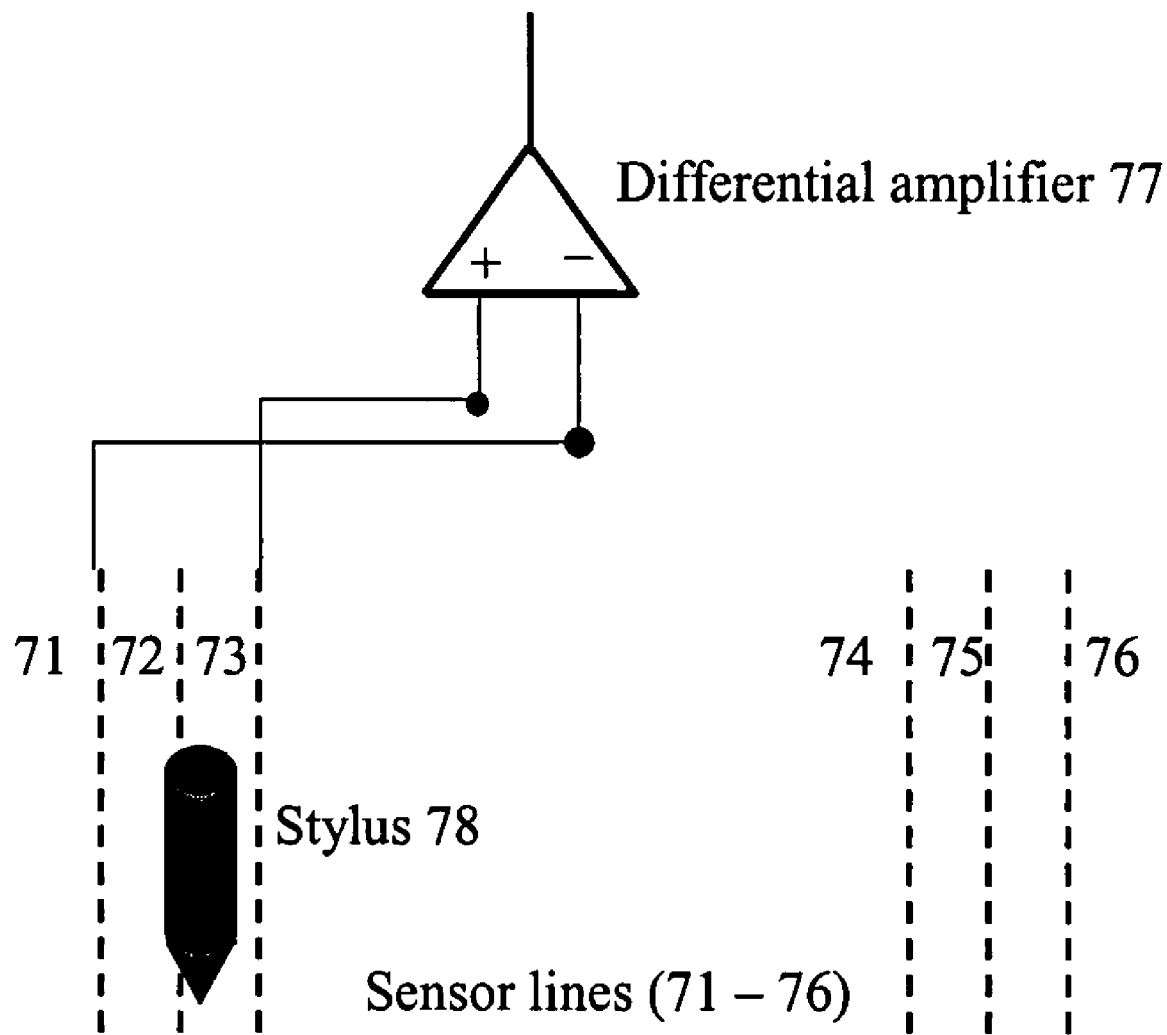
FIG. 6 is a simplified schematic diagram illustrating a scheme for connecting individual sensors of the grid to the differential amplifiers.

Reference is now made to FIG. 6, which is a simplified schematic diagram illustrating a scheme for connecting individual sensors of the grid to the differential amplifiers. Parts that are the same as in previous figures are given the same reference numerals and are not described again except to the extent necessary for an understanding of the present figure. In the scheme, two sensor lines 71 and 73, that are close but not adjacent to one another, are selected. One of the two is then connected to the positive input of the differential amplifier 77 and the other is connected to the negative input of the same differential amplifier. The amplifier is thus able to generate an output signal which is an amplification of the difference between the two sensor line signals. An amplifier having a stylus on one of its two sensor lines will produce a relatively high amplitude output. A major advantage of such a differential based scheme is its inherent noise reduction. If the two lines in the pair are placed relatively close to each other, than both lines probably sense the same parasitic noise and other effects, and the differential amplifier, which subtracts its inputs, thus eliminates any such noise. It is noted that the two input lines which are chosen for connection to the same amplifier are preferably not placed too close to each other, otherwise, a real input signal, such as the stylus signal, is likely to be sensed by both lines and removed by the differential amplifier. Therefore, in a preferred topology, the physical distance between lines connected to the same differential amplifier is slightly larger than the effective range of the stylus transmission. The digital processing unit is subsequently able to use the phase of the sampled signal to determine which of the two inputs of the amplifier have actually received the signal. If the phase is positive than the stylus is probably next to the line that is connected to the positive input of the amplifier and vice versa.

In an alternative embodiment, regular amplifiers may be used in place of differential amplifiers. In such a case the sensor lines are connected to the single inputs of the regular amplifiers.

In a further alternative embodiment the sensor lines may be patterned as loops, rather than straight lines arranged as a grid. In such a case one end of the loop may be connected to a regular amplifier and the other end to a common ground. Alternatively, the two ends of a loop may be connected to the positive and negative connections of a differential amplifier.

In a preferred embodiment, the sensor lines are directly connected to the inputs of the differential amplifiers. However, as an alternative, the lines may be connected via filters, preferably passive, to avoid saturation of the input amplifier due to large noise levels that may occur from time to time at the inputs.

Figure 7:
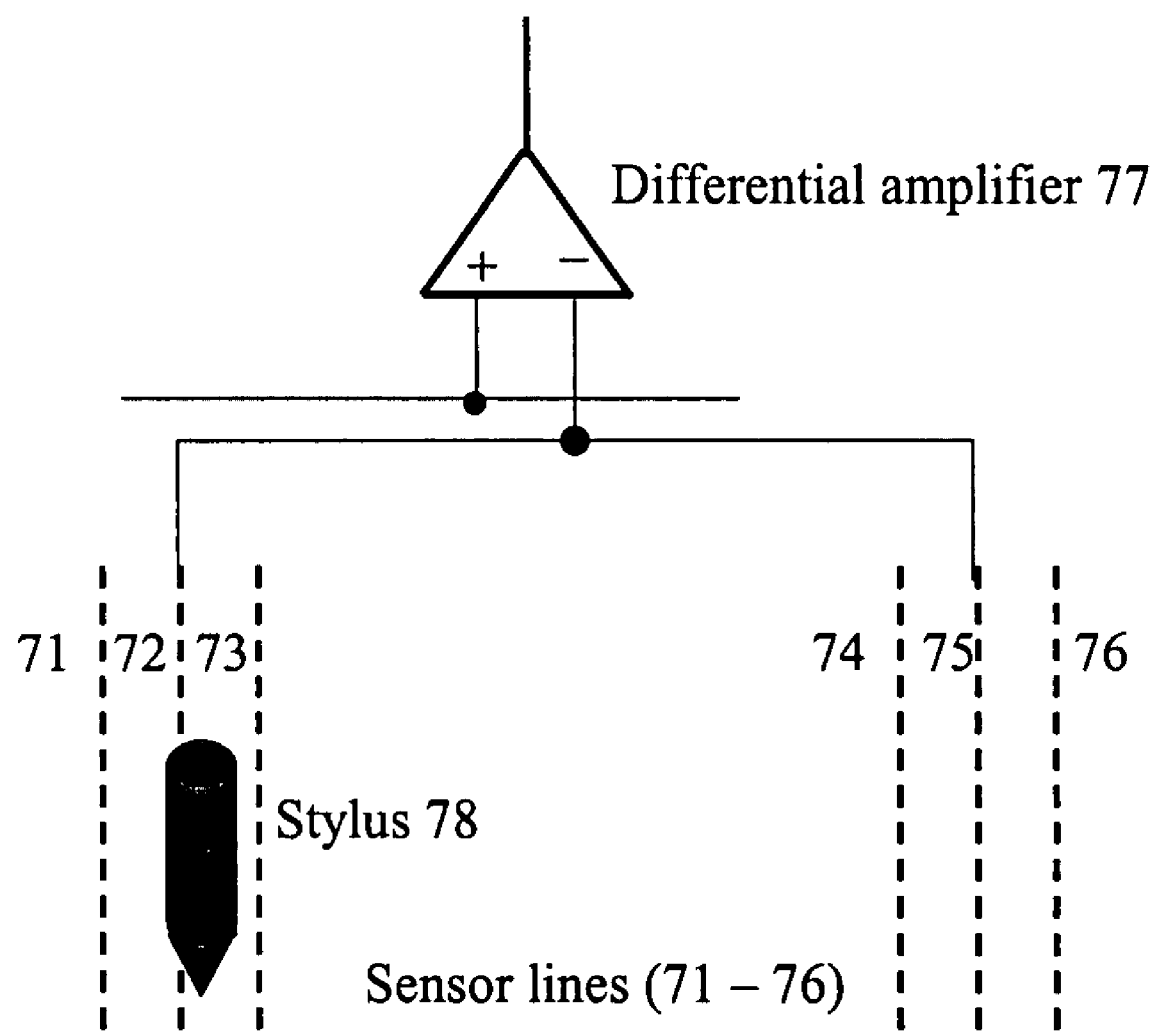
FIG. 7 is a schematic diagram illustrating a variation of the scheme of FIG. 6.

A further embodiment is now explained with respect to FIG. 7, which is a schematic diagram illustrating a variation of the scheme of FIG. 6. Parts that are the same as in FIG. 6 are given the same reference numerals and are not described again except to the extent necessary for an understanding of the present figure. In the variation of FIG. 7, each of the inputs to differential amplifier 77 is connected to two unrelated sensor lines. Thus both sensor lines 72 and 75 are connected to the same positive input of differential amplifier 77. Stylus 78 is located next to sensor line number 2 and transmits a signal that can be picked up by line number 2 and its neighbors 71 and 73. The digital unit receives a signal from differential amplifier 77, but initially does not know whether the signal source is line 72 or line 75. However, since corresponding signals can also be traced to lines 71 and 73, and not to lines 74 and 76, the digital unit is able to deduce the correct source of the signal. Thus, preferably, neighboring sensors are connected to different amplifiers. Furthermore the neighbors of any two sensors connected to the same input should not be connected to corresponding inputs.

As mentioned, the present embodiments are especially applicable to mobile devices, generally battery powered. It is thus helpful to reduce energy consumption to a minimum. Preferably, the front-end components contain a shutdown input command, which switches off various energy consuming chip activities. The digital processing unit may then activate the shut down command as soon as the front-end is not required. Such an action may be activated periodically at a relatively high rate.

Digital Unit

Figure 8:
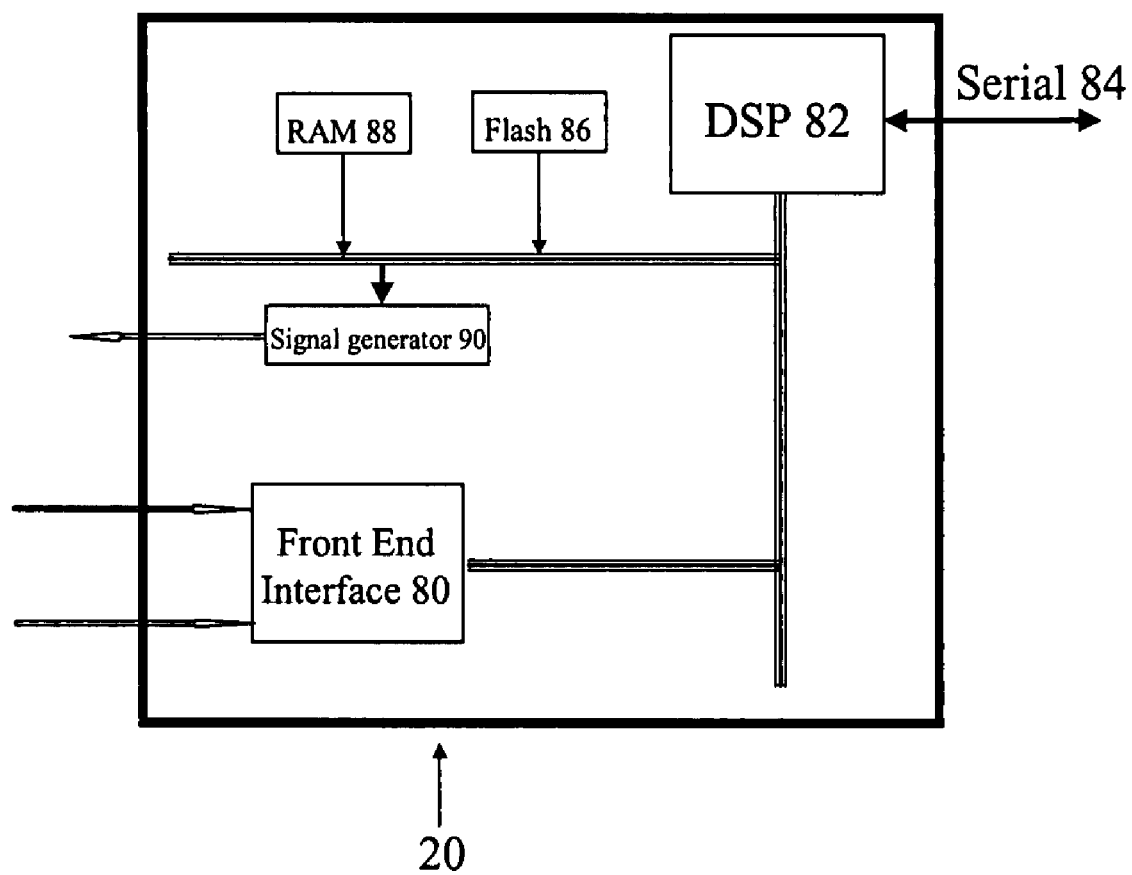
FIG. 8 is a simplified block diagram of the internal structure of a preferred embodiment of the digital processing unit 20 of FIG. 1.

Reference is now made to FIG. 8, which is a simplified block diagram of the internal structure of a preferred embodiment of the digital processing unit 20 of FIG. 1. A front-end interface 80 receives serial inputs of sampled signals from the various front-end units 16 and arranges the inputs into a parallel representation. The parallel representation is transferred to DSP 82, which reads the sampled data, processes the data and determines or calculates the position of the physical objects such as the stylus. The calculated position is then sent to the host computer via link, preferably a serial link 84. Code for operating the DSP 84 is preferably stored in Flash memory 86 and sampled data is stored in RAM 88. Excitation pulses for sending to the excitation coil are produced by the DSP 84, and then transformed into analog signals and amplified by unit 90 for output.

In a preferred embodiment, the digital unit is implemented by a dedicated ASIC, which is preferably mounted on the sensor frame or foil edge. However, in different embodiments, the digital unit may be constructed from off-the-shelf components.

In a preferred embodiment, a DSP core provides the above-described digital unit. Such a DSP core is tailored for signal processing, enables high update rate and is capable of handling more than one object simultaneously. In different embodiments, for products which are more sensitive to price and in which performance can be degraded, a cheaper microcontroller may be selected for doing digital unit processing in place of a DSP.

In a preferred embodiment, the DSP operating code is stored in a Flash memory. Flash memory is easy to update and thus future improvements are simple to incorporate. However, if an update capability can be dispensed with, then cheaper ROM memory can be selected for storing the code.

In a preferred embodiment, the DSP interfaces a host computer via serial link 84. In different embodiments, other types of interfaces, such as USB, may be used. The USB interface is the preferred selection for an accessory type application, that is for an enhancement to an existing screen, since a USB is capable of providing the position detection arrangement of the present embodiments with a power supply. The USB is therefore a natural choice of connection type. If a USB interface is implemented, a USB interface component may be added to the digital unit 20 for handling communication with the host.

Stylus

The preferred embodiments utilize a passive stylus, that is a stylus with no internal power source and no wired connection. Thus, in order to energize the stylus, as described above there is provided external excitation coil 26 which surrounds the sensor and thereby energizes the stylus resonance circuit. An advantage of external excitation is that it inherently provides synchronization of the stylus to the digitizer, since both components are aware of the excitation pulse timing. In alternative embodiments, the stylus may be internally powered using a battery.

In the passive stylus, energy from the external excitation coil induces currents in a receiving coil within the stylus. In order to maximize energy transfer between the external excitation and the stylus, the receiving coil preferably comprises a ferrite core. However, additional embodiments may utilize different types of receiving coils, such as air core or those having other types of cores. The receiving coil is preferably part of a resonant circuit within the stylus.

In a preferred embodiment, COG capacitors are selected to be included in the resonant circuit of the stylus. The advantages of such capacitors are a low sensitivity to changes in temperature and good energy efficiency, the latter being important for a high Q factor and the former being important for a stable resonance frequency. In different embodiments, especially when degraded performance is acceptable and price is critical, other types of capacitor may be used.

Figure 9:
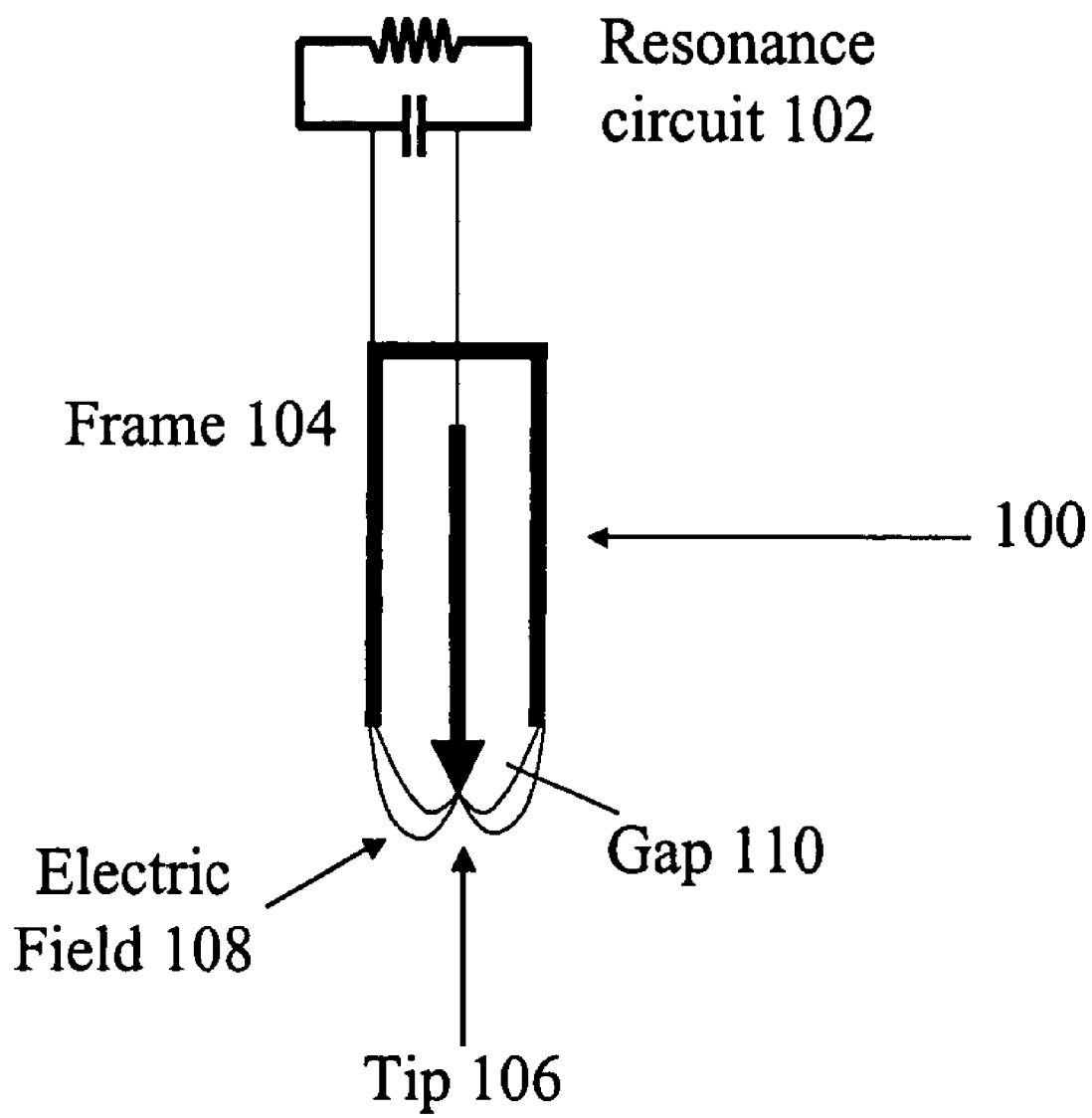
FIG. 9 is a simplified diagram of the internal construction of a stylus according to a preferred embodiment of the present invention.

Reference is now made to FIG. 9, which is a simplified diagram of the internal construction of a stylus according to a preferred embodiment of the present invention. Stylus 100 comprises a resonant circuit 102, and a frame 104 which defines a tip 106. Upon excitation, resonant circuit 102 oscillates at its resonant frequency. One side of the resonant circuit 102 is electrically connected to the stylus tip 106, which preferably comprises a conductive material. The other side of the resonant circuit is electrically connected to frame 104, which likewise comprises conductive material.

In order to avoid parallax, and to achieve the maximum available accuracy, it is advantageous to transmit the position indication response signal from the stylus at a position which is as close as possible to the stylus tip. FIG. 9 illustrates a preferred way of providing such proximity. An electric field 108, synchronized to the resonant circuit oscillations, is formed in a gap 110 located between the tip 106 and the frame 104. The geometric dimensions of the gap and the consequent field are relatively small and the field source is substantially close to the stylus tip.

Figure 10:
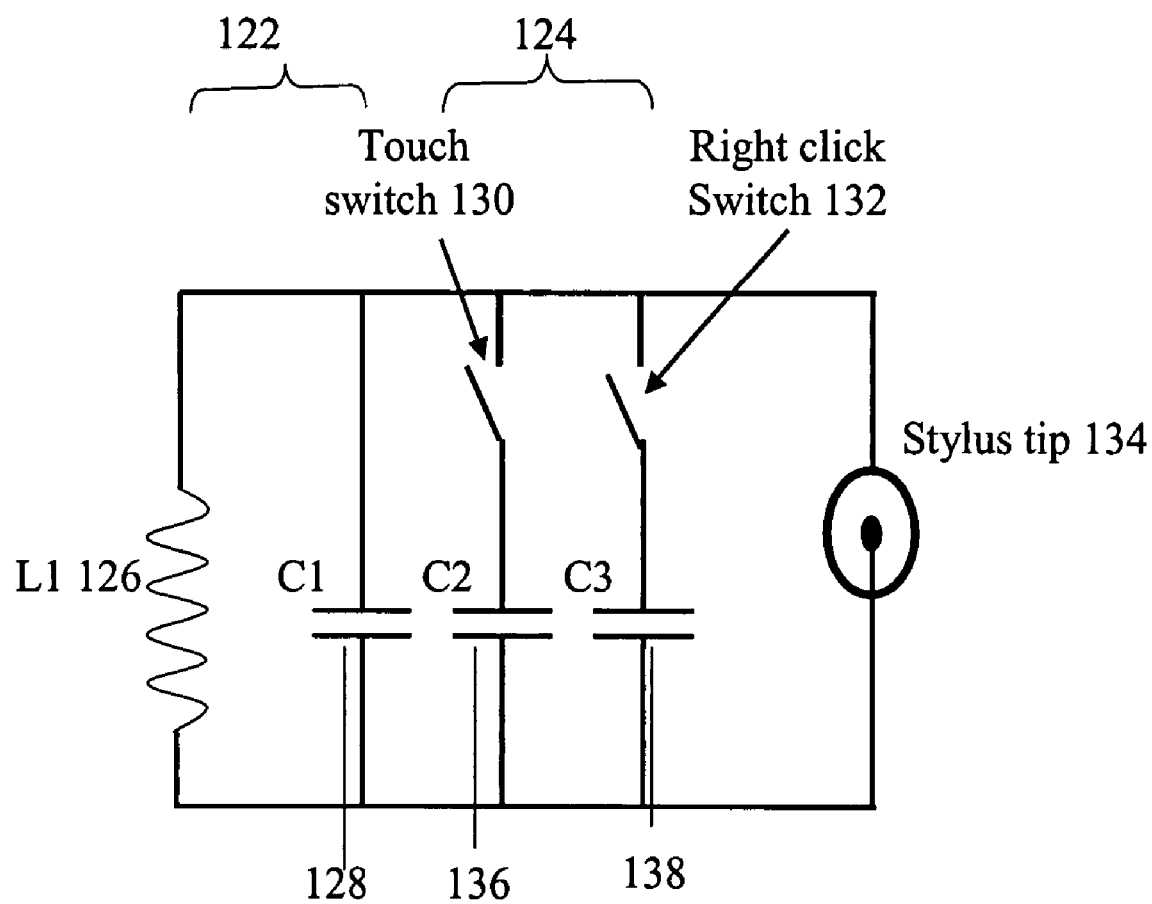
FIG. 10 is a simplified circuit diagram for the stylus of FIG. 9.

Reference is now made to FIG. 10, which is a simplified diagram illustrating a simplified circuit diagram for the stylus of FIG. 9. A resonant circuit 120 comprises a basic resonant section 122 and a variation section 124. The basic resonant section comprises an inductor 126 and capacitor 128, and is excited to oscillate at a basic resonant frequency selected for the stylus. The stylus further comprises a touch switch 130 and a right click switch 132. The stylus tip 134 includes a gap as discussed previously for formation of the electric field. Furthermore the tip is designed to sense when it is in contact with the screen. When the screen is in contact it causes touch switch 130 to close, thereby adding to the basic resonant circuit an additional capacitance 136 in parallel to capacitance 128. The effective capacity thus becomes C1+C2 and the resonant frequency is altered. The signal processing unit 20 is thereby able to determine whether the stylus is actually in contact with the screen or not. The application may for example interpret touch of the stylus on the screen as the equivalent of a left click on the mouse.

User pressure may be used to close Right Click switch 132, thereby to connect capacitor 138 in parallel with capacitor 128. The switch thus changes the effective capacity to be C1+C3 and again changes the resonance frequency. The digital unit detects the change in the frequency and the application interprets the right click accordingly. If both switches 130 and 132 are closed at the same time a fourth frequency is detected by the digital unit equivalent to the capacitance of C1+C2+C3. The system may interpret the fourth frequency as a simultaneous left and right click.

The above embodiment may require excitation at four different frequencies, which wastes energy. It also requires analysis of four separate frequencies in the reception algorithm, thereby consuming CPU resources and energy.

The above method further requires use of a mechanical touch switch, which is placed in the path of the resonance circuit and therefore is required to pass relatively high current. In order to allow a natural feel to handwriting, the stylus touch switch needs to be sensitive and thus designed to be closed under very low pressure. However, mechanical switches with low actuating force do not guarantee a stable and reliable contact.

Figure 11:
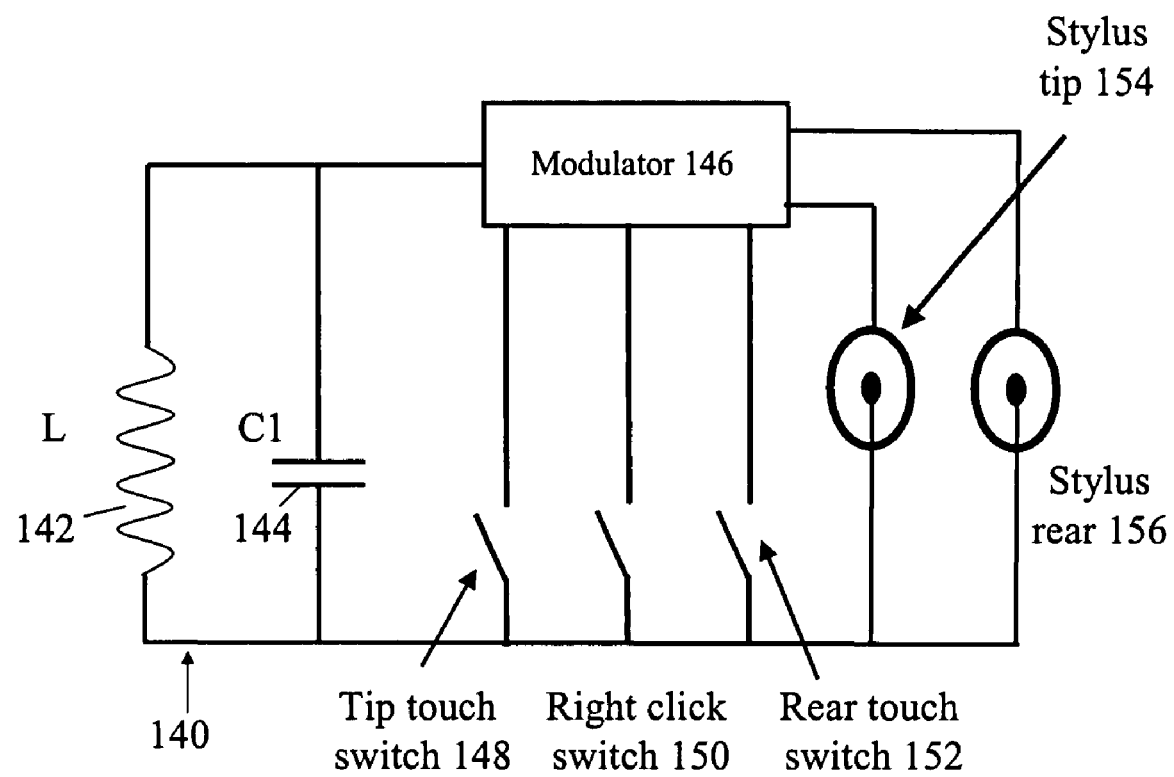
FIG. 11 is a simplified diagram illustrating an alternative circuit diagram for the stylus of FIG. 9.

Reference is now made to FIG. 11, which is a simplified diagram illustrating an alternative circuit diagram for the stylus of FIG. 9. A resonant circuit comprises inductor 142 and capacitor 144 which are excited to oscillate at a predetermined resonant frequency. The resonance oscillations are supplied to a modulator 146 which serves both as a source signal for modulation and as a power supply to the electronic components. The modulator is fed by three inputs; a Tip touch switch 148 which indicates whether the tip of the stylus is touching a surface, a Right click switch 150 which indicates whether the user is pressing the right click button and a rear touch switch 152 which indicates whether the rear of the stylus is touching a surface. The latter may be useful for example for the purpose of using the stylus as an eraser. It is noted that the normal state of any of the switches may be either closed or open. For example, the tip touch switch 148 may be closed when not in touch and open when in touch and vice versa. However, a normally closed state is preferred to avoid bouncing whilst moving when in contact with the surface.

One of the modulated signals is provided to front tip 154 of the stylus, so that the position thereof may be determined during activities such as writing and pointing. The other signal is provided to the stylus rear 156, so that the stylus position can be detected for activities such as erasing, for which the stylus rear might be used. In addition to modulation, the modulator 146 is capable of switching an output off, for example it may switch the rear signal off altogether when the rear switch does not indicate touch.

In a preferred embodiment, the stylus state, that is any of hovering, left click, right click etc may be indicated by modulations introduced by modulator 146. Thus the modulator may introduce a variable time delay between the end of the excitation pulse and the beginning of the stylus signal. An exemplary modulation scheme is as follows: no delay for left click, that is stylus touching the surface, a delay of one oscillation when not touching, that is hovering, a delay of two oscillations for right click and a delay of three oscillations for erasing.

In alternative embodiments, different modulation types are used in place of delays to indicate the stylus state. Suitable modulation types include phase shift (PSK), amplitude modulation (ASK), frequency shift (FSK), and others.

In a further alternative, the modulator can block transmission for a pre-defined amount of time, not during the course of the mode itself but when switching between modes. An example of such a technique is stopping tip transmission for one excitation cycle when switching from hovering to touch (left click down), stopping for two cycles when switching from touch to hovering (left click up), and so forth.

The above embodiments thus provide a stylus which is able to indicate its mode and yet only requires excitation and detection of a single frequency, thus saving energy and other resources.

In a further variation, applicable to any of the above embodiments, different gap geometries may be used for the tip and the rear of the stylus. Thus, for example, with suitable geometry, the electric field at the tip may be geometrically smaller and therefore sensed by fewer sensor lines than the rear field which is more spread out. The digital processing unit may detect such a difference in field size and be able to determine which side of the stylus is touching the surface.

Algorithms

General

Figure 12:
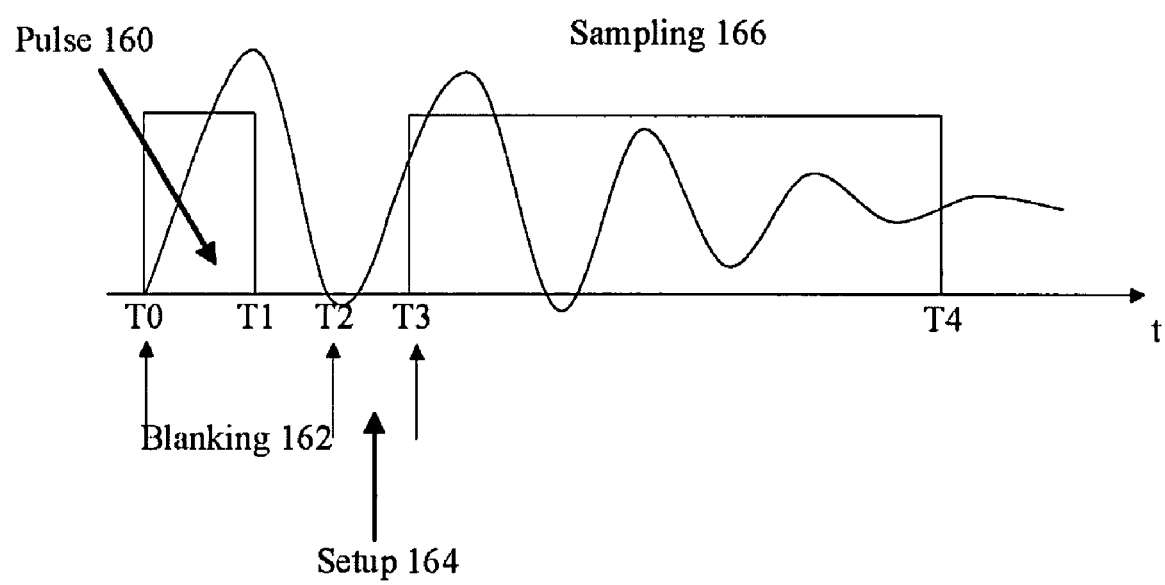
FIG. 12 is a simplified graphical illustration of waveform against time to describe the basic duty cycle of a preferred embodiment of the present invention.

Reference is now made to FIG. 12, which is a simplified graphical illustration of waveform against time to describe the basic duty cycle of a preferred embodiment of the present invention. The cycle is divided into time periods $t_0 \ldots t_4$ which need not be of equal duration. The cycle begins with the issuance of an excitation pulse 260 that lasts from $t_0$ to $t_1$. The excitation pulse is produced by the digital unit 20, as described above, and transmitted by the excitation coil 26 surrounding the sensor. The pulse drives relatively high signals on the sensor lines, which could cause saturation and other effects such as undesirable filter oscillations in the detection electronics. In order to avoid such ill effects the various detection channels at the front-end are blanked for the duration of the pulse. A blanking period 162 is set, which preferably begins at $t_0$ and ends at the beginning of $t_2$. The system then waits for a predetermined period that allows the front-end filters to enter a ready state. This second wait, 164 is known as the setup period, and upon completion thereof the detection electronics at the front end units sample the input signals during a sampling period 166 and convert the signals to digital representation as described above.

In one embodiment, all of the sensor input lines are sampled simultaneously during a single duty cycle. However, alternative embodiments may lack the resources to carry out such comprehensive sampling in a single cycle. In such embodiments, in which sampling resources are limited, the system may repeat the sampling cycle, two or more times, thus sampling a portion of the inputs for each cycle.

In a preferred embodiment, the sampling rate is steady and is at least twice as fast as the highest sampled frequency, the Nyquist rate. However, additional implementations may change the sampling frequency in response to specific applications or in response to a specific situation.

In a preferred embodiment, the digital unit has functionality for dynamically changing the sampling period. A longer sampling period results in a better signal to noise ratio (SNR) and greater ability to distinguish between neighboring frequencies. On the other hand, a shorter sampling period saves energy, saves computation and enables a faster update rate. Dynamic changing of the sampling period can be used to optimize between energy consumption and update rate as per the requirements of specific applications or specific situations. Alternatively, a constant sampling period can be provided.

An example of how optimization may be achieved is as follows: Whilst the stylus is in contact with the screen surface a relatively high update rate is used. However, as soon as the stylus leaves the surface a slower update rate is sufficient and the system switches to a slower energy saving rate. As an alternative, the update rate may be increased during rapid motion of the stylus and decreased when the location of the stylus becomes more steady. Preferably, both the analog front end units and the digital processing unit switch to an energy saving or standby mode when not in use.

Figure 13:
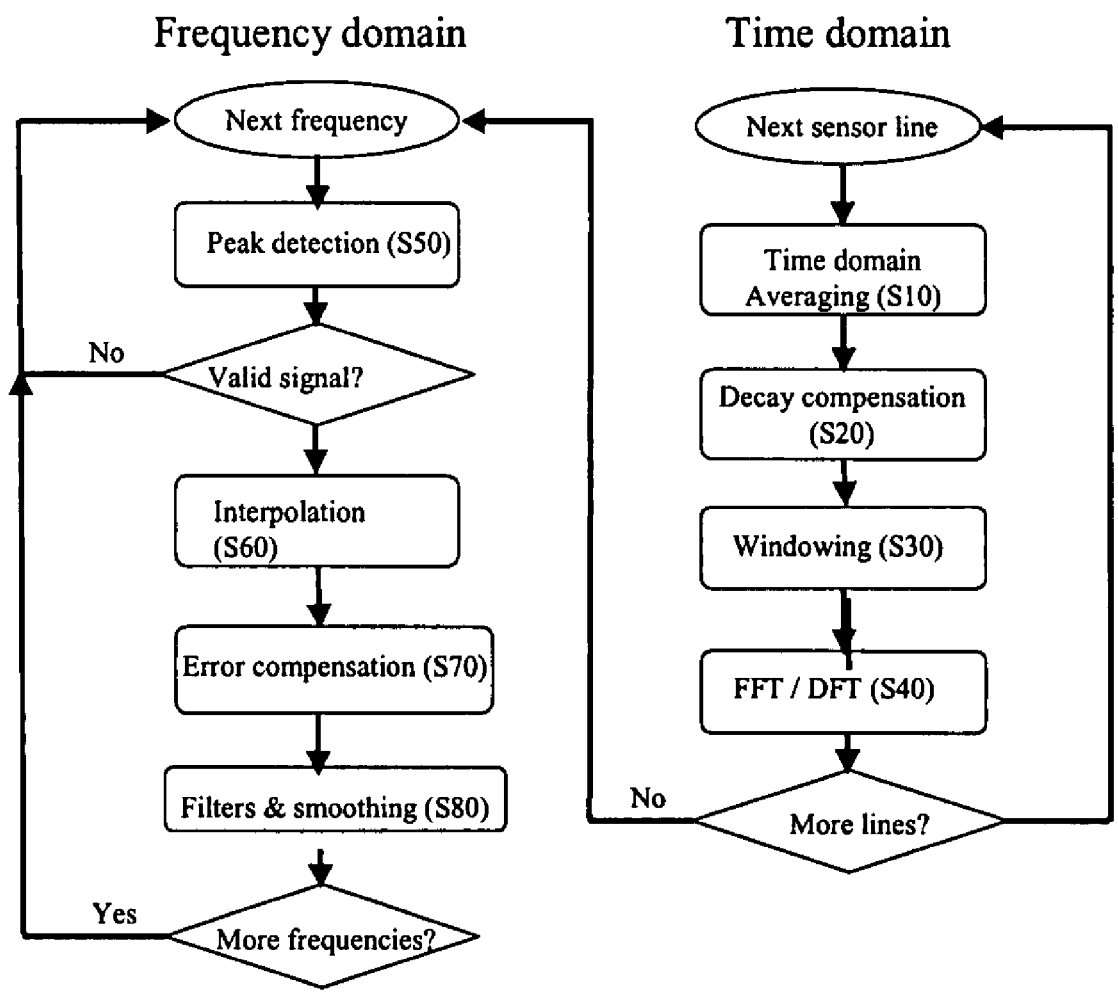
FIG. 13 is a simplified flow chart illustrating the procedure for processing the sensed data in order to determine a current position, according to a preferred embodiment of the present invention.

Reference is now made to FIG. 13, which is a simplified flow chart illustrating the procedure for processing the sensed data in order to determine a current position, according to a preferred embodiment of the present invention. As soon as the system completes sampling of all the sensor inputs, the digital unit starts processing the data in order to determine the physical object's position. Detection is performed in two basic phases; the first is a loop over each one of the sampled sensor lines, performing time-domain algorithms, and the second is a loop over frequency indexes, performing frequency domain algorithms.

In a preferred embodiment, time domain activities begin with averaging S10, in which samples from different cycles are averaged to improve SNR. Next, in a stage S20, the algorithm compensates for the exponential decay of the oscillations. There follows a stage of windowing S30, after which the sampled data is transformed into the frequency domain using either FFT or DFT in a stage S40. Time domain activity is repeated for all of the sensor lines.

At the end of the time domain loop, the system enters the frequency domain loop. In a preferred embodiment, frequency domain activities start with peak detection S50, in which the algorithm finds a location at which the signal at a given frequency is maximal, the frequency being selected to correspond to a given stylus in a given state. Then, in a stage S60, if a valid peak is detected, the algorithm interpolates the relevant signals to determine an accurate position. As will be recalled, a given signal is detected over a number of nearby sensors, and a position can be determined by interpolation to a greater accuracy than the granularity of the sensors. Issues of resolution, averaging and interpolation are discussed in greater detail below. In stage S70, fixed errors, if any, may be corrected, for example to compensate for steady electrical interference. Finally, in a stage S80, a determined position may be smoothed on the basis of positions from previous cycles.

Averaging

It is a general object of the present embodiments to be able to provide the best available resolution. One of the major factors affecting the resolution is instability caused by noise. Therefore, preferred embodiments attempt to improve SNR. One of the ways to improve SNR is averaging between samples taken at different times. However, with such averaging, there is a corresponding decrease in update rate. Thus, in a preferred embodiment, averaging is dynamically managed by the digital unit to optimize stability vs. update rate in accordance with requirements of specific applications or specific situations. In other embodiments, averaging may be avoided or may be carried out in a static manner.

It should be noted that averaging may either be carried out in the time domain, by averaging the samples themselves, or in the frequency domain, by averaging frequency coefficients. Both possibilities have the same mathematical affect in terms of masking noise and thus improving the SNR. However, time domain averaging is generally computationally more efficient since transforms need only be done once, however time domain averaging is wasteful of memory. In embodiments where memory capacity is at a greater premium than computational capacity, averaging may be carried out in the frequency domain.

Decay Compensation

As described above, the signal emitted by the stylus is sampled during exponential decay of the resonance circuit oscillations. Transforming a decaying signal from the time to the frequency domain can result in undesirable side lobes, which interfere with resolution. It is desirable to enable as good as possible distinction between close frequencies and to prevent false detection of frequencies not actually in use. Therefore, in a preferred embodiment, the system compensates for decay by multiplying the signal with the opposite exponential function.

The resonance circuit Q factor drives the exponential coefficient of the decaying function. The Q factor may differ slightly from one physical object to another. In a preferred embodiment, for simplicity, the exponential compensation coefficient is a static value standing for the average Q factor. However, other embodiments may utilize a dynamic compensation coefficient that is specifically tuned, either manually or automatically, for each relevant object.

Windowing

In a preferred embodiment, the input samples are multiplied by Hamming window coefficients prior to FFT/DFT transforming. As a result, undesired frequency side lobes are eliminated and false detections are avoided. However, different embodiments use different types of windows, such as Hanning, triangular or the like, or even use a simple square window with no additional modifications.

Transform Into Frequency Domain

As described above, the input samples are transformed from the time to the frequency domain using either the DFT (Discrete Fourier Transform or FFT (Fast Fourier Transform). There is no mathematical difference between the results of the above transforms. However, FFT is more efficient when processing a large number of frequencies and DFT is more efficient when processing a small number of frequencies. In a preferred embodiment, the digital unit dynamically selects between FFT and DFT in accordance with the number of frequencies currently in use. Other possibilities are to preselect one or the other of the transforms based on the likely number of frequencies to be used in a given application. Thus an application in which only a single stylus is ever likely to be used may initially be set to DFT. A chess game, in which each playing piece has a different frequency may be set to FFT, and a general purpose application may switch between the two transforms as the number of frequencies being used changes. Yet further embodiments may use other transformation from time to frequency domain.

In a preferred embodiment, for simplicity, the magnitude or energy at the given frequency may be used for calculating the object location after the transformation into the frequency domain. However, since the phase of the input signal may also be known, it may be possible to use the component of the frequency magnitude in the pre-known phase. Furthermore, if only one frequency is used at a certain time, then it may be possible to tune the time point at which sampling starts, so that the phase of the signal exactly matches the real or imaginary part of the frequency coefficients. Such tuning permits an improvement in overall computational efficiency.

Peak Detection

Having isolated the energy at the given frequency, a peak detection phase follows in which a first rough determination is made of a location where the signal in is maximal. In a preferred embodiment, the algorithm looks for the maximal magnitude in the X axis and simultaneously looks for the maximal magnitude in the Y-axis. If both the X and Y maximal magnitudes are determined to exceed a preset threshold, than a physical object is likely to be located about the intersection of the two maximal coordinates.

Interpolation

Figure 14:
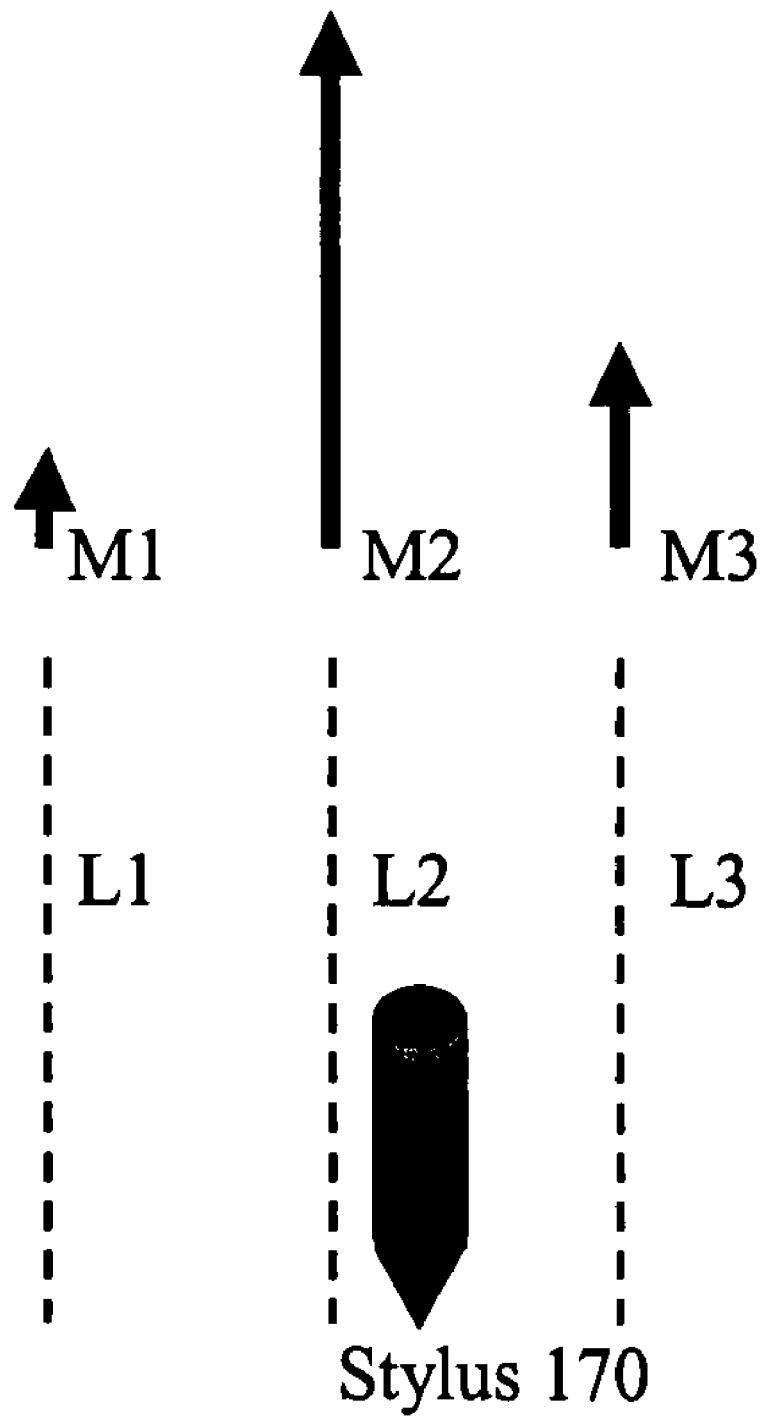
FIG. 14 is a simplified diagram illustrating a stylus located in proximity to three sensing lines and generating signals in the sensing lines respectively.

Reference is now made to FIG. 14, which is a simplified diagram illustrating a stylus 170 located in proximity to three sensing lines L1, L2 and L3 and generating signals M1, M2 and M3 respectively. Stylus 170 is not accurately located opposite any of the sensing lines but rather is at an intermediate position between two of them. Having made an approximate location based on peak detection, an interpolation phase follows to increase the accuracy of the determined location. That is to say, the object of the interpolation phase is to determine an accurate location of the physical object beyond the granularity of the sensing devices. In a preferred embodiment, interpolation is performed on detection data measured from two input lines, the line having the maximal magnitude for the given axis as determined in the previous stage, and the neighboring line having the next highest magnitude. Thus in FIG. 14, stylus 170 is placed next to lines L1, L2 and L3. The lines sense signals of magnitudes M1, M2 and M3 respectively. As shown in the figure, the stylus is located between lines L2 and L3, at a position closer to L2. Thus L2 (M2) senses the highest signal magnitude, L3 (M3) senses a lower signal magnitude, and L1 (M1) senses the lowest magnitude. The algorithm detects L2 as the line having the maximal magnitude (M2). Since M3 is greater than M1, L3 is selected to take part in the interpolation procedure with L2. Interpolation between L2 and L3 may be performed, for example, using the following formula:

$$X = (X2 * (M2^K) + X3 * (M3^K)) / ((M2^K) + (M3^K))$$

where X2 and X3 stand for the location of L2 and L3 on the X-axis, M2 and M3 are the signal magnitudes and K is a constant set according to the geometric shape of the stylus electric field.

Different embodiments may use different interpolation functions, different interpolation algorithms or larger number of lines in the interpolation process. Thus interpolation based on the three lines having the highest signals may be expected to provide improved location accuracy for relatively little increase in processing cost.

Error Compensation

The error compensation stage, S70 in FIG. 13, corrects systematic errors that are caused by static electric interference, such as that imposed by the FPD structure and topology. In many cases, a front mounted sensor is not sensitive to this type of interference and therefore no error compensation is used. However, there are many applications in which error compensation of this kind is useful. One way of implementing such an error correction process is to use a customized look-up table. The look up table may be operated on the host computer or be configured into the digital processing unit, and is typically in the form of a two-dimensional matrix. The matrix cells represents sensor coordinates and the cells content is a two-dimensional error value for the relevant position. Such a matrix may automatically be built as a final stage of the manufacture process by a robot arm system that moves a stylus through a series of pre-defined known locations and stores data relating to the difference between the known and the actually detected positions. At run time, the system may either select the error value stored in the matrix cell closest to the reported position, or may interpolate a detected value by a number of matrix cells around the reported position according to the error value given. The matrix may be combined with the sensor line tolerance compensation database referred to above if present.

Smoothing

Stage 80 of the flow chart of FIG. 13 relates to smoothing. The object of the smoothing stage is to smooth stylus movement using the history of the previous stylus positions. The smoothing filters out temporary and static fluctuations that are not a reasonable human movement, in order to display a smoother image on the graphical display.

In one preferred embodiment, the smoothing phase is implemented at the host computer. Implementation may be as a dedicated package in the system driver or as part of general support provided within the operating system. In another embodiment, smoothing is carried out at the digital unit 20.

In a preferred embodiment, smoothing comprises filtering undesired frequencies from the movement pattern. This may, for example, be achieved by transforming the vector obtained of successive stylus positions into the frequency domain, setting undesired frequency coefficients to zero, and switching back to the time domain for display purposes. Other embodiments of the present invention may use other types of filters, such as filters that fit a best curve, and the like.

It is noted that smoothing filters that use both history and future positions normally perform better than those that use history alone. However, using both historical and future positions can make it difficult to produce real time results, due to the need to make an assessment of likely future positions. The above disadvantage is significant while writing or painting on a display such as an FPD, wherein the user expects the drawing to match the tip of the stylus closely. One solution is to use a combination of two filters; the first being a reactive filter, or even no filter at all, that has a tiny delay and which is used to provide stylus movement tracking on the screen in real time. The second is a slower filter that uses future knowledge and back-corrects the already displayed curve, so that glitches disappear before they are able to do any harm.

Excitation Pulse

The excitation pulse is a dominant energy consumer. It is desirable to minimize energy consumption overall, especially as many likely applications for the present embodiments are on battery-powered portable devices of one kind or another. It is therefore preferable to minimize the pulse energy consumption.

In a preferred embodiment, the excitation pulse comprises one or more sine waves. In different embodiments, other types of pulse, such as impulse, square wave and like pulses may be used.

In a preferred embodiment, the digital unit dynamically controls the excitation signal pattern. The system is aware of the objects and corresponding frequencies currently taking part in a given session, and produces excitation waves accordingly. System awareness of participating objects may be provided as pre-knowledge from the application or as a dynamic analysis of the current inputs. Thus, at the start of the session, the system obtains the frequencies of the participating devices from the application, or interrogates the participating devices or analyzes its inputs to determine the frequencies present. The system then restricts the excitation signal pattern to that optimal for those frequencies. Other embodiments may use a static pulse pattern that ensures the excitation of all relevant frequencies.

In general, a longer excitation pulse results in lower energy consumption. On the other hand, a long pulse may limit the overall update rate. As discussed above, preferred embodiments optimize energy consumption and update rate to the requirements of specific applications or specific situations, either by preselecting an optimal excitation pulse length for the application or by dynamically changing the pulse length during operation.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A passive stylus for use with a digitizer, comprising:
an outer stylus shaped front housing having a front tip,
a corresponding reverse tip, the reverse tip located at a second end of the stylus remote from said front tip,
a resonator arrangement electrically connected at one end to both the front tip and the reverse tip and at another end to both the front housing and the rear housing, the resonator arrangement having a resonant frequency, and a first gap formed between the front housing and the front tip across which said resonator arrangement is coupled, to create a first electric field concentration in a vicinity of said front tip, a second gap formed between the rear housing and the reverse tip across which said resonator arrangement is coupled, to create a second electric field concentration in a vicinity of said rear tip.

2. The passive stylus of claim 1, further comprising a ferrite coil.

3. The passive stylus of claim 1, wherein said resonator is remotely located from at least one of said front tip and said reverse tip and coupled thereto via a conductor.

4. The passive stylus of claim 1, further comprising switchable components to contribute to said resonator arrangement to modify said resonant frequency to indicate different mode settings of said stylus.

5. The passive stylus of claim 1, further comprising a modulator for providing detectable variations in said first electric field according to different mode settings of said stylus.

6. The passive stylus of claim 5, wherein said detectable variations are variable delays in coupling of said electric field to said first gap.

7. The passive stylus of claim 6, wherein the different mode settings of said stylus is selected from a group including at least one of right click, left click, hover and erase.

8. The passive stylus of claim 5, further comprising a normally closed switch associated with said front tip.

9. The passive stylus of claim 1, further comprising switchable components associated with said reverse tip, to contribute to said resonator arrangement to modify said resonant frequency to indicate different mode settings of said stylus.

10. The passive stylus of claim 1, wherein a portion of each of the front tip, the reverse tip, the rear housing and the front housing electrically connected to the resonator arrangement is formed from a conductive material.

11. The passive stylus of claim 1, wherein the resonator arrangement has a predetermined resonant frequency.

12. A passive stylus for use with a digitizer, comprising:
an outer stylus shaped housing having a front tip, a resonator arrangement electrically connected at one end to the front tip and at another end to the housing, the resonator arrangement having a resonant frequency, a gap formed between the housing and the front tip across which said resonator arrangement is coupled, to create an electric field concentration in a vicinity of said front tip, and a reverse tip located at a second end of the stylus remote from said front tip, a conductor arrangement extending to said reverse tip, wherein a geometry of the gap in the vicinity of said reverse tip is defined to be different from the geometry of the gap in the vicinity of said front tip, thereby to provide a detectable difference between output from said front and reverse tips.

13. The passive stylus of claim 12, further comprising switchable components to contribute to said resonator arrangement to modify said resonant frequency to indicate different mode settings of said stylus.

14. A passive stylus for use with a digitizer, comprising:
an outer stylus shaped housing having a front tip, a resonator arrangement electrically connected at one end to the front tip and at another end to the housing, the resonator arrangement having a resonant frequency, a gap formed between the housing and the front tip across which said resonator arrangement is coupled, to create an electric field concentration in a vicinity of said front tip, and a reverse tip located at a second end of the stylus remote from said front tip, a conductor arrangement extending to said reverse tip, wherein a size of an electric field concentration of said reverse tip is defined to be larger than a size of the electric field concentration of said front tip, thereby to provide a detectable difference between said electric field concentration from the front and reverse tips.

15. The passive stylus of claim 14, further comprising switchable components to contribute to said resonator arrangement to modify said resonant frequency to indicate different mode settings of said stylus.

\* \* \* \* \*